(12) United States Patent
Kawamura et al.

(10) Patent No.: US 7,184,647 B2
(45) Date of Patent: Feb. 27, 2007

(54) INFORMATION CARRIER, DEVICE FOR READING AND DEVICE FOR PROVIDING THE INFORMATION CARRIER AND METHOD OF TRANSMITTING PICTURE INFORMATION

(75) Inventors: Makoto Kawamura, Kanagawa (JP); Yasushi Fujinami, Kanagawa (JP); Wiebe De Haan, Eindhoven (NL)

(73) Assignees: Sony Corporation, Tokyo (JP); Philips Electronics N.V., Eindhoven (NL)

( * ) Notice: Subject to any disclaimer, the term of this patent is extended or adjusted under 35 U.S.C. 154(b) by 1131 days.

(21) Appl. No.: 09/938,252

(22) Filed: Aug. 23, 2001

(65) Prior Publication Data
US 2002/0126991 A1   Sep. 12, 2002

Related U.S. Application Data

(63) Continuation of application No. 08/692,918, filed on Jul. 31, 1996.

(30) Foreign Application Priority Data

| Aug. 4, 1995 | (JP) | 7-200121 |
| Aug. 4, 1995 | (JP) | 7-200122 |
| Aug. 16, 1995 | (EP) | 95202215 |

(51) Int. Cl.
*H04N 7/00* (2006.01)
*H04N 7/26* (2006.01)
*H04N 5/85* (2006.01)

(52) U.S. Cl. .......... 386/46; 386/109; 386/125
(58) Field of Classification Search ........... 386/46, 386/52, 125, 124, 109, 111, 112, 55, 1, 4
See application file for complete search history.

(56) References Cited

U.S. PATENT DOCUMENTS

| 5,172,111 A |   | 12/1992 | Olivo, Jr. ................ 348/7 |
| 5,377,051 A |   | 12/1994 | Lane et al. ............... 386/68 |
| 5,589,945 A |   | 12/1996 | Abecassis ................ 386/83 |
| 5,852,664 A | * | 12/1998 | Iverson et al. ........... 705/51 |
| 6,895,171 B1 | * | 5/2005 | Taira et al. .............. 386/95 |

FOREIGN PATENT DOCUMENTS

| JP | 07212768 | 11/1995 |
| WO | WO 95/12275 | 5/1995 |

* cited by examiner

*Primary Examiner*—Robert Chevalier
(74) *Attorney, Agent, or Firm*—Oblon, Spivak, McClelland, Maier & Neustadt, P.C.

(57) ABSTRACT

Information carrier, device for reading and device for providing the information carrier and method of transmitting picture information.

The disclosed system comprises an information carrier (1) on which an information signal is recorded that represents picture information intended for being displayed on a picture screen, which picture information comprises video information of a video programme as well as control information for selectively displaying the video programme. The video programme is subdivided into sections (35) and, when the video programme is displayed selectively, sections are shown in a new order (34) and partly omitted or replaced. To this end the control information includes path information (36) which indicates a path of sections to be displayed in linked fashion. The path information may be recorded multiplexed with MPEG-2 video information and then contains addresses (53, 54, 55, 56, 57, 58, 59) for forward and backward jumps.

68 Claims, 30 Drawing Sheets

| Syntax | No. of bits | Mnemonic |
|---|---|---|
| path_descriptor() | | |
| { | | |
|     descriptor_tag | 8 | uimsbf |
|     descriptor_length | 8 | uimsbf |
|     reserved | 5 | bslbf |
|     path_number | 3 | uimsbf |
|     reserved | 4 | bslbf |
|     PTS[32..30] | 3 | bslbf |
|     marker | 1 | bslbf |
|     PTS[29..15] | 15 | bslbf |
|     marker | 1 | bslbf |
|     PTS[14..0] | 15 | bslbf |
|     marker | 1 | bslbf |
|     track_number | 16 | uimsbf |
|     pX_sectors_to_read | 24 | uimsbf |
|     pX_sectors_from_start | 24 | uimsbf |
|     pX_offset_next_section | 32 | imsbf |
|     pX_offset_previous_section | 32 | imsbf |
|     pX_offset_next_track | 32 | imsbf |
|     pX_offset_start_track | 32 | imsbf |
|     pX_track_tc_hours_1 | 4 | bslbf |
|     pX_track_tc_hours_2 | 4 | bslbf |
|     pX_track_tc_minutes_1 | 4 | bslbf |
|     pX_track_tc_minutes_2 | 4 | bslbf |
|     pX_track_tc_seconds_1 | 4 | bslbf |
|     pX_track_tc_seconds_2 | 4 | bslbf |
|     pX_track_tc_CC | 2 | bslbf |
|     pX_track_tc_frames_1 | 2 | bslbf |
|     pX_track_tc_frames_2 | 4 | bslbf |
|     pX_path_tc_hours_1 | 4 | bslbf |
|     pX_path_tc_hours_2 | 4 | bslbf |
|     pX_path_tc_minutes_1 | 4 | bslbf |
|     pX_path_tc_minutes_2 | 4 | bslbf |
|     pX_path_tc_seconds_1 | 4 | bslbf |
|     pX_path_tc_seconds_2 | 4 | bslbf |
|     pX_path_tc_CC | 2 | bslbf |
|     pX_path_tc_frames_1 | 2 | bslbf |
|     pX_path_tc_frames_2 | 4 | bslbf |

FIG. 6A (TRACK NUMBER DESCRIPTOR)

| BP | Field name | Content |
|---|---|---|
| 1 | Volume Descriptor Type | numerical value |
| 2 to 6 | Standard Identifier | CD001 |
| 7 | Volume Descriptor Version | numerical value |
| 8 | Unused Field | (00) byte |
| 9 to 40 | System Identifier | a-characters |
| 41 to 72 | Volume Identifier | d-characters |
| 73 to 80 | Unused Field | (00) bytes |
| 81 to 88 | Volume Space Size | numerical value |
| 89 to 120 | Unused Field | (00) bytes |
| 121 to 124 | Volume Set Size | numerical value |
| 125 to 128 | Volume Sequence Number | numerical value |
| 129 to 132 | Logical Block Size | numerical value |
| 133 to 140 | Path Table Size | numerical value |
| 141 to 144 | Location of Occurrence of Type L Path Table | numerical value |
| 145 to 148 | Location of Optional Occurrence of Type L Path Table | numerical value |
| 149 to 152 | Location of Occurrence of Type M Path Table | numerical value |
| 153 to 156 | Location of Optional Occurrence of Type M Path Table | numerical value |
| 157 to 190 | Directory Record for Root Directory | 34 bytes |
| 191 to 318 | Volume Set Identifier | d-characters |
| 319 to 446 | Publisher Identifier | a-characters |
| 447 to 574 | Data Preparer Identifier | a-characters |
| 575 to 702 | Application Identifier | a-characters |
| 703 to 739 | Copyright File Identifier | d-characters, SEPARATOR 1, SEPARATOR 2 |
| 740 to 776 | Abstract File Identifier | d-characters, SEPARATOR 1, SEPARATOR 2 |
| 777 to 813 | Bibliographic File Identifier | d-characters, SEPARATOR 1, SEPARATOR 2 |
| 814 to 830 | Volume Creation Date and Time | Digit(s), numerical value |
| 831 to 847 | Volume Modification Date and Time | Digit(s), numerical value |
| 848 to 864 | Volume Expiration Date and Time | Digit(s), numerical value |
| 865 to 881 | Volume Effective Date and Time | Digit(s), numerical value |
| 882 | File Structure Version | numerical value |
| 883 | (Reserved for future standardization) | (00) byte |
| 884 to 1 395 | Application Use | not specified |
| 1 396 to 2 048 | (Reserved for future standardization) | (00) bytes |

FIG. 11

| Syntax | No. of Bits | Mnemonic |
|---|---|---|
| disc_toc (){ | | |
|     dvd_signature | 64 | bslbf |
|     dvd_version | 32 | bslbf |
|     length | 16 | uimsbf |
|     toc_type | 8 | bslbf |
|     reserved | 8 | bslbf |
|     album() | | |
|     catalogue() | | |
|     reserved | 16 | uimsbf |
|     number_of_programs (NOP) | 16 | bslbf |
|     rating_definitions_offset | 32 | uimsbf |
|     program_linkage_offset | 32 | uimsbf |
|     disc_track_offset | 32 | uimsbf |
|     program_toc_pointers_offset | 32 | uimsbf |
|     disc_play_time_offset | 32 | uimsbf |
|     disc_name_offset | 32 | uimsbf |
|     disc_date_offset | 32 | uimsbf |
|     disc_copyright_offset | 32 | uimsbf |
|     disc_publisher_offset | 32 | uimsbf |
|     reserved | 288 | bslbf |
|     rating_definitions() | | |
|     program_linkage() | | |
|     disc_tracks() | | |
|     program_toc_pointers() | | |
|     disc_play_time() | | |
|     disc_name() | | |
|     disc_date() | | |
|     disc_copyright() | | |
|     disc_publisher() | | |

FIG. 12

| Syntax | No. of Bits | Mnemonic |
|---|---|---|
| disc_tracks() { | | |
|     for(i=0; i < 8; i++){ | | |
|         number_of_tracks(NOT) | 16 | uimsbf |
|         reserved | 16 | bslbf |
|         for (t=0; t < NOT; t++) { | | |
|             program_number | 16 | uimsbf |
|             track_number | 16 | uimsbf |
|             start_lsa | 32 | uimsbf |
|             last_lsa | 32 | uimsbf |
|             last_es_lsa | 32 | uimsbf |
|             stoppiing_stc | 32 | uimsbf |
|             playing_time() | | |
|         } | | |
|     } | | |
| } | | |

FIG. 12A

| Syntax | No. of Bits | Mnemonic |
|---|---|---|
| program_toc(){ | | |
|     dvd_signature | 64 | bslbf |
|     dvd_version | 32 | bslbf |
|     length | 16 | uimsbf |
|     toc_type | 8 | bslbf |
|     reserved | 8 | bslbf |
|     number_of_tracks (NOT) | 16 | uimsbf |
|     reserved | 16 | bslbf |
|     program_start_lsa | 32 | uimsbf |
|     path_rating_assignment_offset | 32 | uimsbf |
|     for (i=0; i<8; i++){ | | |
|         program_tracks_offset_i | 32 | uimsbf |
|     } | | |
|     elementary_stream_info_offset | 32 | uimsbf |
|     program_play_times_offset | 32 | uimsbf |
|     program_name_offset | 32 | uimsbf |
|     track_names_offset | 32 | uimsbf |
|     program_date_offset | 32 | uimsbf |
|     track_dates_offset | 32 | uimsbf |
|     program_copyright_offset | 32 | uimsbf |
|     program_publisher_offset | 32 | uimsbf |
|     reserved | 288 | bslbf |
|     path_rating_assignments() | | |
|     for (i=0; i<8; i++){ | | |
|         if (program_chapters_offset_i>0){ | | |
|             program_tracks() | | |
|             entry_points() | | |
|             path_table() | | |
|         } | | |
|     } | | |
|     elementary_stream_info() | | |
|     program_play_times() | | |
|     program_name() | | |
|     track_names() | | |
|     program_date() | | |
|     track_dates() | | |
|     program_copyright() | | |
|     program_publisher() | | |

FIG. 13

| Syntax | No. of Bits | Mnemonic |
|---|---|---|
| program_tracks() { | | |
|     number_of_path_tracks(NOPT) | 16 | uimsbf |
|     reserved | 16 | bslbf |
|     for (t=0; t < NOPT; t++) { | | |
|         reserved | 16 | bslbf |
|         track_number | 16 | uimsbf |
|         start_rsa | 32 | uimsbf |
|         last_rsa | 32 | uimsbf |
|         last_es_rsa | 32 | uimsbf |
|         stoppi ng_stc | 32 | uimsbf |
|         track_playing_time() | 32 | uimsbf |
|     } | | |
| } | | |

FIG. 13A

| Syntax | No. of Bits | Mnemonic |
|---|---|---|
| path_table() { | | |
|     number_of_sections(NOCH) | 32 | uimsbf |
|     for (ch=0; ch < NOCH; ch++) { | | |
|         start_rsa | 32 | uimsbf |
|         last_rsa | 32 | uimsbf |
|         stoppi ng_stc | 32 | uimsbf |
|         last_es_rsa | 32 | uimsbf |
|     } | | |
| } | | |

FIG. 13B

| Syntax | No. of Bits | Mnemonic |
|---|---|---|
| PES_packet(){ | | |
|     packet_start_code_prefix | 24 | bslbf |
|     stream_id | 8 | uimsbf |
|     PES_packet_length | 16 | uimsbf |
|     if (stream_id != program_stream_map | | |
|     && stream_id !=padding_stream | | |
|     && stream_id !=private_stream_2 | | |
|     && stream_id !=ECM | | |
|     && stream_id !=EMM | | |
|     && stream_id !=program_stream_directory | | |
|     && stream_id !=DSMCC_stream | | |
|     && stream_id !=ITU-T Rec. H.222.1 type E_stream){ | | |
|         '10' | 2 | bslbf |
|         PES_scrambling_control | 2 | bslbf |
|         PES_priority | 1 | bslbf |
|         data_alignment_indicator | 1 | bslbf |
|         copyright | 1 | bslbf |
|         original_or_copy | 1 | bslbf |
|         PTS_DTS_flags | 2 | bslbf |
|         ESCR_flag | 1 | bslbf |
|         ES_rate_flag | 1 | bslbf |
|         DSM_trick_mode_flag | 1 | bslbf |
|         additional_copy_info_flag | 1 | bslbf |
|         PES_CRC_flag | 1 | bslbf |
|         PES_extension_flag | 1 | bslbf |
|         PES_header_data_length | 8 | uimsbf |
|         if (PTS_DTS_flag == '10') { | | |
|             '0010' | 4 | bslbf |
|             PTS [32..30] | 3 | bslbf |
|             marker_bit | 1 | bslbf |
|             PTS [29..15] | 15 | bslbf |
|             marker_bit | 1 | bslbf |
|             PTS [14..0] | 15 | bslbf |
|             marker_bit | 1 | bslbf |
|         } | | |
|         if (PTS_DTS_flags == '11') { | | |
|             '0011' | 4 | bslbf |
|             PTS [32..30] | 3 | bslbf |
|             marker_bit | 1 | bslbf |
|             PTS [29..15] | 15 | bslbf |
|             marker_bit | 1 | bslbf |
|             PTS [14..0] | 15 | bslbf |
|             marker_bit | 1 | bslbf |
|             '0001' | 4 | bslbf |
|             DTS [32..30] | 3 | bslbf |
|             marker_bit | 1 | bslbf |
|             DTS [29..15] | 15 | bslbf |

FIG. 16A

| Syntax | No. of Bits | Mnemonic |
|---|---|---|
|     marker_bit | 1 | bslbf |
|     DTS [14..0] | 15 | bslbf |
|     marker_bit | 1 | bslbf |
| } | | |
| if (ESCR_flag == '1') { | | |
|     reserved | 2 | bslbf |
|     ESCR_base [32..30] | 3 | bslbf |
|     marker_bit | 1 | bslbf |
|     ESCR_base [29..15] | 15 | bslbf |
|     marker_bit | 1 | bslbf |
|     ESCR_base [14..0] | 15 | bslbf |
|     marker_bit | 1 | bslbf |
|     ESCR_extension | 9 | uimsbf |
|     marker_bit | 1 | bslbf |
| } | | |
| if (ES_rate_flag == '1') { | | |
|     marker_bit | 1 | bslbf |
|     ES_rate | 22 | uimsbf |
|     marker_bit | 1 | bslbf |
| } | | |
| if (DSM_trick_mode_flag == '1') { | | |
|     trick_mode_control | 3 | uimsbf |
|     if (trick_mode_control == fast_forward) { | | |
|         field_id | 2 | bslbf |
|         intra_slice_refresh | 1 | bslbf |
|         frequency_truncation | 2 | bslbf |
|     } | | |
|     else if (trick_mode_control == slow_motion) { | | |
|         rep-cntrl | 5 | uimsbf |
|     } | | |
|     else if (trick_mode_control == freeze_frame) { | | |
|         field_id | 2 | uimsbf |
|         reserved | 3 | bslbf |
|     } | | |
|     else if (trick_mode_control == fast_reverse') { | | |
|         field_id | 2 | bslbf |
|         intra_slice_refresh | 1 | bslbf |
|         frequency_truncation | 2 | bslbf |
|     else if (trick_mode_control == slow_reverse) { | | |
|         rep_cntrl | 5 | uimsbf |
|     } | | |
|     else | | |
|         reserved | 5 | bslbf |
| } | | |
| if (additional_copy_info_flag == '1') { | | |
|     marker_bit | 1 | bslbf |
|     additional_copy_info | 7 | bslbf |

FIG. 16B

| Syntax | No. of Bits | Mnemonic |
|---|---|---|
| } | | |
| if (PES_CRC_flag == '1') { | | |
|     previous_PES_packet_CRC | 16 | bslbf |
| } | | |
| if (PES_extension_flag == '1') { | | |
|     PES_private_data_flag | 1 | bslbf |
|     pack_header_field_flag | 1 | bslbf |
|     program_packet_sequence_counter_flag | 1 | bslbf |
|     P-STD_buffer_flag | 1 | bslbf |
|     reserved | 3 | bslbf |
|     PES_extension_flag_2 | 1 | bslbf |
|     if (PES_private_data_flag == '1') { | | |
|         PES_private_data | 128 | bslbf |
|     } | | |
|     if (pack_header_field_flag == '1') { | | |
|         pack_field_length | 8 | uimsbf |
|         pack_header() | | |
|     } | | |
|     if (program_packet_sequence_counter_flag == '1') { | | |
|         marker_bit | 1 | bslbf |
|         program_packet_sequence_counter | 7 | uimsbf |
|         marker_bit | 1 | bslbf |
|         MPEG1_MPEG2_identifier | 1 | bslbf |
|         original_stuff_length | 6 | uimsbf |
|     } | | |
|     if (P-STD_buffer_flag == '1') { | | |
|         '01' | 2 | bslbf |
|         P-STD_buffer_scale | 1 | bslbf |
|         P-STD_buffer_size | 13 | uimsbf |
|     } | | |
|     if (PES_extension_flag_2 == '1') { | | |
|         marker_bit | 1 | bslbf |
|         PES_extension_field_length | 7 | uimsbf |
|         for (i=0; i<PES_extension_field_length; i++) { | | |
|             reserved | 8 | bslbf |
|         } | | |
|     } | | |
| } | | |
| for (i=0; i<N1; i++) { | | |
|     stuffing_byte | 8 | bslbf |
| } | | |
| for (i=0; i<N2; i++) { | | |
|     PES_packet_data_byte | 8 | bslbf |

FIG. 16 C

| Syntax | No. of Bits | Mnemonic |
|---|---|---|
| `    }`<br>`  }`<br>`  else if (stream_id == program_stream_map`<br>`    || stream_id == private_stream_2`<br>`    || stream_id == ECM`<br>`    || stream_id == EMM`<br>`    || stream_id == program_stream_directory`<br>`    || stream_id == DSMCC_stream)`<br>`    || stream_id == ITU-T Rec. H.222.1 type E stream {`<br>`      for (i=0; i<PES_packet_length; i++) {`<br>`        PES_packet_data_byte` | 8 | bslbf |
| `      }`<br>`  }`<br>`  else if (stream_id == padding_stream) {`<br>`      for (i=0; i<PES_packet_length; i++) {`<br>`        padding_byte` | 8 | bslbf |
| `      }`<br>`  }`<br>`}` | | |

FIG.16 D

| Syntax | No. of Bits | Mnemonic |
|---|---|---|
| program_stream_map(){ | | |
|     packet_start_code_prefix | 24 | bslbf |
|     map_stream_id | 8 | uimsbf |
|     program_stream_map_length | 16 | uimsbf |
|     current_next_indicator | 1 | bslbf |
|     reserved | 2 | bslbf |
|     program_stream_map_version | 5 | uimsbf |
|     reserved | 7 | bslbf |
|     marker_bit | 1 | bslbf |
|     program_stream_info_length | 16 | uimsbf |
|     for (i=0;i<N;i++){ | | |
|         descriptor() | | |
|     } | | |
|     elementary_stream_map_length | 16 | uimsbf |
|     for (i=0;i<N1;i++){ | | |
|         stream_type | 8 | uimsbf |
|         elementary_stream_id | 8 | uimsbf |
|         elementary_stream_info_length | 16 | uimsbf |
|         for (i=0;i<N2;i++){ | | |
|             descriptor() | | |
|         } | | |
|     } | | |
|     CRC_32 | 32 | rpchof |
| } | | |

FIG. 22B

X...PADDING DATA
AF...AUDIO FRAME (AUDIO ACCESS UNIT)
I ...I PICTURE (VIDEO ACCESS UNIT)
P...P PICTURE (VIDEO ACCESS UNIT)
B...B PICTURE (VIDEO ACCESS UNIT)

EXAMPLE IN WHICH PREDICTION
(REFERENCE) IS     MADE ON
BOTH SIDES OF JUMP POINT

INFORMATION CARRIER, DEVICE FOR READING AND DEVICE FOR PROVIDING THE INFORMATION CARRIER AND METHOD OF TRANSMITTING PICTURE INFORMATION

CROSS-REFERENCE TO RELATED APPLICATION

This application is a continuation of co-pending U.S. patent application Ser. No. 08/692,918, which was filed on Jul. 31, 1996, and which is hereby incorporated by reference.

BACKGROUND OF THE INVENTION

The invention relates to an information carrier on which an information signal is recorded, the signal representing picture information intended to be displayed on a picture screen, the picture information comprising video information of at least a single video program and control information for displaying various versions of the video program.

The invention further relates to a device for reading and a device for providing the information carrier.

The invention also relates to a method of transmitting picture information via the information carrier. Such an information carrier, reading device and transmitting method are disclosed in published U.S. Pat. No. 4,930,158. On the known information carrier, such as, for example, a video tape, a video program is recorded and for fully reproducing the video program the information carrier can be read on a standard playback system. When played back on the known system, the video program may also be reproduced selectively while certain parts of the video program are not displayed. For this purpose, the video signal repeatedly contains classification codes, for example, via digital codes stored on an invisible video line. The recovered classification code is compared with a classification selected by the user and, in dependence on the result, the replay is interrupted or the output signal is blocked until a permitted classification code is detected. This may avoid, for example, children viewing pornographic or violent scenes.

A problem with the known information carrier is that the picture reproduction is interrupted during selective replay when classified parts of the video signal occur. Such an interruption is continued until again a permitted classification code is detected in the video signal. These interruptions cause the viewing of the video program during selective replay to be annoying, the more so because one does not know how long such an interruption will last.

More specifically still, this invention relates to a method of recording time-division multiplexed compressed audio and video data on a data recording medium, a method of reproducing such data, an apparatus for recording such data, and an apparatus for reproducing such data. A data recording medium may take a number of different forms, including magnetic tapes or disks, magneto-optical disks, optical disks, semiconductor memory, and the like.

In the production of video works, e.g. motion pictures, television programs, etc., it is commonplace for different versions of a particular work to be created. Although sharing certain video images and portions of soundtrack, each version of a work can differ from others by including or excluding other images and audio segments. For example, certain scenes of a motion picture may be cut entirely or a selection may be made from a number of different photographed versions of a particular scene. Such versions may be created to satisfy management concerns or to reflect political policy or cultural standards. Multiple versions of a work may created, each work having a different length and each being adapted particularly for display in a theater, for transmission via television broadcast, or for recording/reproduction by domestic consumer recording/reproducing devices.

Further, the version of a work initially released to a market may be later modified and re-released to reflect changed circumstances or the author's intention. For example, a director may re-edit a work to produce a "director's cut edition" which differs from the originally-released version. Further, a "complete edition," a "special edition," and so forth may also be produced in connection with a particular work.

Particularly relevant to the present invention is the international practice of rating video works according to the content of the work, e.g. certain material is determined to be unsuitable for viewing by certain audiences. In some countries, video works are designated for viewing by only adult audiences while minor-aged persons are prohibited from viewing or purchasing such works. In the United States, the rating system is not law but is a voluntary system adopted by film makers, distributors, and sellers. According to this voluntary system, movies may be classified into the following five categories: G—General audiences, all ages permitted; PG—Parental Guidance Suggested, some material may not be suitable for children; PG-13—Parents strongly cautioned, some material may be inappropriate for children under the age of 13; R—Restricted, children under the age of 17 must be accompanied by a parent or adult guardian; and NC-17—No children under the age of 17 admitted. In accordance with this system, access to certain video works, whether displayed in a theater or available for purchase or rental on a prerecorded video media, has been restricted for certain categories of consumers. Inherent in this system has been the practice of rating an entire video work as a whole as opposed to rating component portions.

Compliance with the voluntary rating system in connection with video works available on prerecorded media may be increased by implementing a rating monitoring system in the device for reproducing the video work. The video work is coded with an indication of its rating, e.g. a flag indicating adult entertainment is written to the prerecorded media, and this coding is detected by the reproduction system. When it is determined that the viewer does not meet the rating criteria, reproduction of the video work is prohibited.

In a European digital telecasting system, a "Parental Rating" function is available. Where a scene of a program deserves a particular rating, a rating identification code is placed before the beginning of the program. In "rating" mode, the receiver is able to receive/display only those programs consistent with the parental rating. Specifically, the receiver detects the rating identification code at the start of the video program and discontinues reproduction of the program if its rating is inconsistent with the parental rating. In this manner, viewing of a program can be inhibited.

As an alternative to the above-described system, viewer compliance with video program rating may be achieved on a scene-by-scene basis. A rating code may be inserted before a particular scene for detection by the reproduction system. If the rating code is inconsistent with a previously established rating, the rated scene may not be reproduced and "noise" or another video image or scene may be displayed. Normal reproduction of the original video program is resumed once the rated scene comes to a close.

Such a system has the disadvantage that the continuity of the display of the program is interrupted. If the length of the rated scene is not known to the viewer, the "noise" or other temporary image is necessarily viewed until display of the original program is resumed. Similarly, when the program is reproduced from a prerecorded medium, a special reproduction operation, such as high-speed search, may be initiated by the reproduction device upon detection of the rating identification code. In certain implementations, such a system may suffer the disadvantage of reproducing for viewing the rated scene.

Japanese patent application Hei-6-335602 describes two techniques for reproducing a video work from a prerecorded medium. In one reproduction operation, only unrestricted portions of a video work are reproduced. In another reproduction operation, restricted portions of a video work are reproduced. The reference does not describe the utilization of rating identification codes in connection with scenes of a video work.

OBJECTS AND SUMMARY OF THE INVENTION

It is an object of the invention, for example, to provide means for transmitting video information by which a video program can be reproduced selectively substantially without interruptions.

According to a first aspect of the invention, an information carrier of a type defined in the opening paragraph is characterized in that the control information comprises path information indicative of one or more versions of video information sections to be reproduced in a linked fashion, the path information being indicative of sections to be reproduced consecutively. The information carrier according to the invention is advantageous, for example, in that the path information indicates a path of linked sections, so that a next section can be sought rapidly once the end of a section has been reached. As a result, a substantially continuous reproduction of a selective version of the video program is possible. In addition, the sections may be selected differently for each version, so that various versions are formed from the same video program.

It is a further object of the invention to provide means for transmitting picture information, so that a basic version of the video program can be reproduced on a device not arranged for selective playback. An embodiment of the information carrier according to the invention is therefore characterized in that the video information of a video program is subdivided into two portions, the first portion comprising the video information of a basic version and the second portion comprising additional video information, and a version comprising at least one section of the additional video information. The additional video information does not form part of the non-selective basic version of the video program. The inclusion of a section of the additional video information in a version creates a selective version of the video program, whereas the basic version can also be played back on a player that is not arranged for reproducing sections that are interlinked along a path. This is furthermore advantageous in that, for example, a more aggressive scene may be substituted for another scene without disturbing the story of the video program. Alternatively, a longer version of the video program may be formed, such as, for example, a director's cut.

A further embodiment of the information carrier according to the invention is characterized in that the sections are addressable and in that the path information comprises addresses of sections to be displayed consecutively. This is advantageous in that a playback device can search for the destination in the fastest possible way after a section has ended, for example, the read head of a playback device for an optical disc can jump forthwith to the address of the next section.

A further embodiment of the information carrier according to the invention is characterized in that the path information comprises playtime information. This is advantageous in that the user can be shown the exact playtime of a version after the selection. During selective playback, this exact playtime will differ from the original playtime.

A further embodiment of the information carrier according to the invention is characterized in that the path information comprises track information indicative of a subdivision into tracks, while the tracks are numbered independently for each video program. This is advantageous in that the user has the disposal of a logical track arrangement with tracks numbered from 1 upwards for each video program. In addition, a numbering in sequential form can be used for each version.

A further embodiment of the information carrier according to the invention is characterized in that path information for displaying each version is recorded in an information carrier area that can be located. This is advantageous in that the path information of any desired version can be recovered in a simple manner.

A further embodiment of the information carrier according to the invention is characterized in that the path information is recorded on the information carrier near to entry points, while playback is possible from the entry points without the use of previous picture information. This is advantageous in that relevant path information is available forthwith when a jump is made to an entry point in the video program and when the picture display is started from an entry point.

A further embodiment of the information carrier according to the invention is characterized in that the information carrier is subdivided into addressable sectors and in that the path information near to an entry point comprises address information relative to the respective entry point. This is advantageous in that, when a jump is made, the jump distance for controlling the reading system is known from an entry point.

A further embodiment of the information carrier according to the invention is characterized in that the video program is subdivided into tracks and in that the path information near to an entry point comprises address information indicative of the beginning of the next track in the respective version. This is advantageous in that a next track can forthwith be jumped to during playback.

A further embodiment of the information carrier according to the invention is characterized in that the path information near to an entry point comprises address information of video information to be displayed beforehand. This is advantageous in that during reverse playback a previous section or track can simply be found back.

A further embodiment of the information carrier according to the invention is characterized in that the path information near to an entry point comprises time code information indicative of the playtime from the beginning of the respective version. This is advantageous in that a continuously running time indication is available from the start of a specific version that is played back.

According to a second aspect of the invention, a device for reading an information carrier of a type defined in the opening paragraph, the device comprising first means for recovering the picture information and control means for selectively reproducing the video program in response to the control information, is characterized in that the control information comprises path information indicative of one or more versions of video information sections to be reproduced in linked fashion, the path information being indicative of sections to be reproduced consecutively, and in that the device comprises second means for recovering the path information and in that the control means are adapted for consecutively reproducing the video program sections in response to the path information. This is advantageous, for example, in that selective versions of a video program, built up from consecutive sections in an order denoted by the path information, are displayed substantially or completely without interruptions.

An embodiment of the device according to the invention is characterized in that the path information comprises playtime information and the device comprises means for displaying the playtime in response to the path information. This is advantageous in that a user is shown the real playtime of the selected version.

A further embodiment of the device according to the invention is characterized in that path information for displaying each version is recorded in a locatable area of the information carrier and in that the second means are adapted for locating the area. This is advantageous in that any possible version is known and can be stored in a memory after the area has been located and the path information has been recovered. As a result, the device can timely read the video information necessary for a specific version. It is also possible to skip directly to a specific part of a version.

A further embodiment of the device is characterized in that path information is recorded on the information carrier near to entry points, while playback is possible from the entry points without the use of previous picture information, and in that the second means are adapted for recovering the path information near to entry points. This is advantageous in that, after a jump to another item of the video program, the path information relative to that item is available forthwith. Consequently, a large memory in the playing device for retaining all the path information has become redundant.

A further embodiment of the device is characterized in that the path information near to an entry point comprises address information of video information to be displayed beforehand, and in that the control means are adapted for displaying the picture information in reverse direction in response to said addresses. This is advantageous in that a selective version of the video program can also be displayed in reverse direction substantially without interruptions.

A further embodiment of the device is characterized in that the path information near to an entry point comprises time code information indicative of the playtime from the beginning of the respective path, and in that the device comprises means for displaying the playtime in response to the time code information. This is advantageous in that the user can be shown a continuously running time indication from the beginning of the playing of the version.

According to a third aspect of the invention, a device for providing an information carrier of a type defined in the opening paragraph, the device comprising means for coding the picture information and means for recording the information signal on the information carrier, is characterized in that the control information comprises path information indicative of one or more versions of video information sections to be shown in linked fashion, the path information being indicative of sections to be displayed consecutively, and in that the device comprises means for generating the path information and means for adding the path information to the picture information.

According to a fourth aspect of the invention, a method of transmitting picture information intended for being displayed on a picture screen via an information carrier on which an information signal representing picture information is recorded, this picture information comprising video information of at least one video program and control information for displaying various versions of the video program, is characterized in that the control information comprises path information indicative of one or more versions of video information sections to be shown in a linked fashion, the path information being indicative of sections to be displayed consecutively. This is advantageous in that a plurality of versions of a video program can be transmitted via information transfer while the necessary transmission and storage capacity remains restricted.

A still further object of the present invention is to provide apparatus for recording on an information carrier different versions of a video work, each version including one or more portions of the work.

Yet another object of the present invention is to provide apparatus that allows a user to select among plural recorded versions of a work a version for reproduction that is consistent with the user's preferences.

Another object of the present invention is to provide apparatus for reproducing different versions of a work according the rating assigned to the work.

According to a fifth aspect of the present invention, a method for displaying one of a plurality of versions of a program recorded on an information carrier is provided. The method includes the steps of: displaying to a user rating information regarding at least two of the versions of the program; receiving from the user a selection of one of the versions; and reproducing from the information carrier the selected version for display to the user.

According to a sixth aspect of the present invention, a method for recording a plurality of versions of a program on an information carrier, where each version may include a number of program sections, is provided. The method includes the steps of: encoding the program sections to produce encoded program sections; appending an address information to each of the encoded program sections; appending a version information to each of the encoded program sections; and recording the encoded program sections, including the address information and the version information, on the information carrier.

According to a seventh aspect of the invention, a method for reproducing one of a plurality of versions of a program recorded on an information carrier, where the versions include a plurality of program sections, is provided. The method includes the steps of: reproducing from the information carrier a first program section that includes a plurality of version information and a plurality of address information; detecting in the first program section a version information corresponding to the one version and an address information corresponding to the version information; and reproducing from the information carrier a second program section according to the address information.

According to an eighth aspect of the invention, a method for reproducing one of a plurality of versions of a program recorded on an information carrier, where the versions include a plurality of program sections, is provided. The method includes the steps of: reproducing from the information carrier a version information corresponding to the one version and an address information corresponding to the version information; and reproducing from the information carrier a program section according to the address information.

Apparatuses corresponding to each of the fifth, sixth, and seventh aspects of the invention are also an aspect of the present invention.

These and other aspects of the invention will be apparent from and elucidated with reference to the embodiments described hereinafter. Other objects, features, and advantages according to the present invention will become apparent from the following detailed description of illustrated embodiments when read in conjunction with the accompanying drawings.

BRIEF DESCRIPTION OF THE DRAWINGS

In the drawings:
FIG. 6A shows a path_descriptor,
FIG. 11 shows a data format according to ISO 9660,
FIG. 12 shows a disc table of contents,
FIG. 12A shows a disc_tracks,
FIG. 13 shows a program table of contents,
FIG. 13A shows a program_tracks,
FIG. 13B shows a path_table,
FIG. 14 shows the formation of different versions of a program,
FIGS. 16A, 16B, 16C, and 16D show a PES packet,
FIGS. 22A and 22B show a PSM packet.

DETAILED DESCRIPTION OF THE PREFERRED EMBODIMENTS

Figure 1:
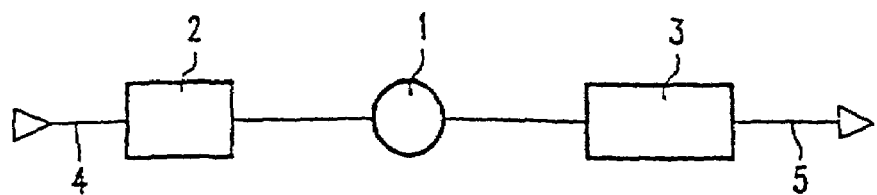
FIG. 1 shows a system for picture information transmission.

Elements in the drawing Figures corresponding to elements already described carry like reference characters.
FIG. 1 shows a system for picture information transmission via an information carrier 1. The picture information is transmitted via an information signal. Picture information contains not only video information, but also any information related to the picture such as, for example, sound, subtitles and control information. An amount of video information that is intended to be displayed as a whole is called a video program. The device 2 for providing the information carrier codes picture information supplied thereto through input 4 and modulates the information signal with the coded picture signal and subsequently records the modulated information signal on the record carrier 1. The reading device 3 reads the information carrier 1 and demodulates and decodes the information signal and reproduces the picture information for the user on output 5. For example, a magnetic tape or an optical disc such as a laser disc or digital video disc may be used as an information carrier. The information signal may also be transmitted to a user via a network from an information carrier in a central storage means, such as a video server, in which case the user's commands are transferred to the video server. The information signal is at least a representation of the video information, such as, for example, an analog video signal according to the PAL or NTSC standard, or a digitally coded and, compressed video signal according to MPEG-1 or MPEG-2. The information signal is furthermore a representation of the control information coded by information symbols. In the case of an analog video signal the symbols may be co-transmitted in the format of digital signals during horizontal or vertical blanking, such as, for example, in the known Teletext system. In the case of a fully digital picture signal, such as MPEG-2, a separate data stream of user data may be co-transmitted by multiplexing, for example, by subdividing the digital stream into packets of, for example, 2048 bytes and providing these packets with a header that denotes the type of information. With respect to MPEG-2, the coding of picture information is described in the international ITU/ISO 13818-2 standard, and the ITU/ISO 13818-1 standard (proposed in ISO/IEC JTC1/SC29/WG11, Nov. 13, 1994) describes how elementary streams of coded video data are multiplexed with other coded data which are representative of, for example, audio and subtitles to become a program stream. Information of a type not specified by MPEG-2 may be included in "private packets" in an arbitrary format. MPEG-2 packets with an additional header of the prescribed format are then distinguished as "private stream 1", and without as "private stream 2".

Figure 2:
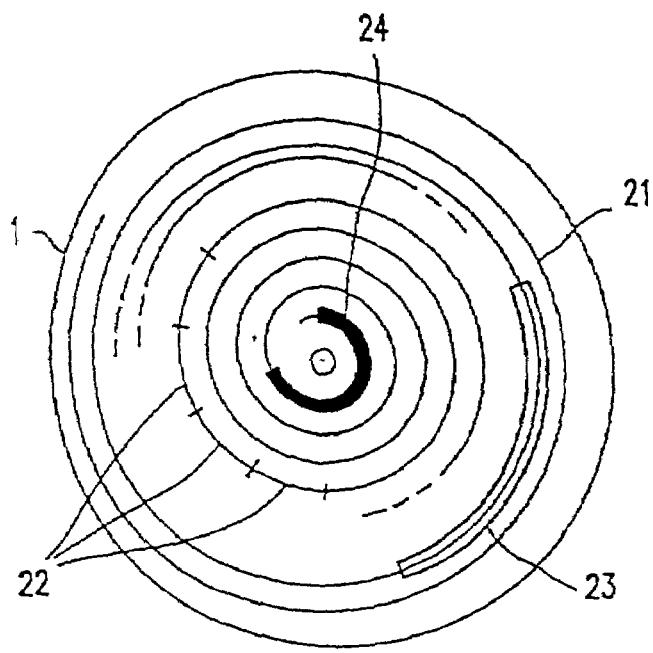
FIG. 2 shows an information carrier.

FIG. 2 shows a disc-shaped optically readable information carrier 1, such as a CD or laser disc. The information signal representing picture information intended for being displayed on a picture screen is recorded in a helical or concentric track 21. The picture information and the information signal are described with reference to FIG. 1. A description of recording and reading a CD may be found, in the title 'Principles of optical disc systems' by Bouwhuis et al., ISBN 0-85274-785-3. The track is subdivided into addressable sectors 22. The information carrier may contain a Table Of Contents 24 (TOC) in which a reference to the information of one or more video programs is included. The TOC 24 is located at a fixed position on the information carrier. The information carrier may also have an information structure in which the space available for information storage is arranged in directory Tables for the storage of specific information. An example of this is described in ISO 9660 standard, in which information storage in files 23 is effected via directory Tables. These directory Tables may be located via a reference address at a fixed position at the beginning of the area intended for the information storage.

Figure 3:
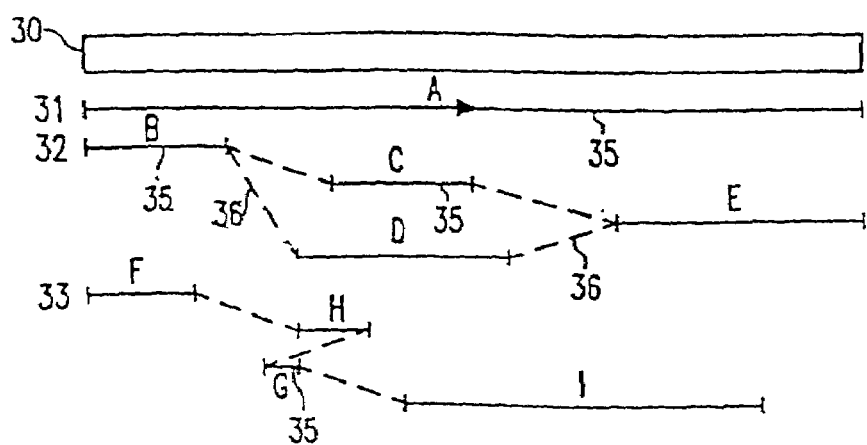
FIG. 3 shows a video program and several paths of sections.

FIG. 3 shows a video program and several section paths according to the invention. A video program is shown diagrammatically by a bar 30. The video program can be played in the original, non-selective version from beginning to end without interruptions along a basic path 31. For selective playback, the video program is subdivided into sections 35 for each version. The original version is shown by the basic path 31, the total video program being considered a single section A. When playback is effected along the basic path 31, the video information is shown in the order it was recorded. Playing a selected version along a path 32 is shown diagrammatically by line sections 35 to be displayed and jumps with interrupted line sections 36.

For a first version, the total video program is subdivided into sections B, C and E section B being the beginning, C being a short middle section and section E being the end. The path information denotes the linking information from B to C and from C to E as is indicated by the interrupted line sections 36. Once a section B has been played back, the reading of the information carrier is continued at the beginning of the next section C, while the intermediate area is covered by a jump. In consequence, a first version of the video program B-C-E arises in which certain parts of the original are skipped. For a second version which has a longer middle section, section D is given, which contains section C surrounded by video material. The second version then consists of the sections B, D and E for which less video material is skipped than for the first version. The path information for the second path comprises the beginnings and ends of the sections B, D and E and the linking information from B to D and from D to E, as well as the information that E is the last section. Thus, in this manner the path information provides after section B an option to split, which option depends on the version selected.

In another embodiment of the information carrier 1, each path is indicated from beginning to end of the respective version of the video program, such as indicated, for example, by another version 33 for which the video program is subdivided into the sections F, G, H and I. The route along the particular path is indicated as F, H, G and I by the linking information, so that section H is thus shown prior to a section G, whereas in the recording order H comes after G. However, the linking information may provide an entirely random path for which the recording order does not pose any restrictions. There may also be observed that the last section I, and thus the playback part, ends earlier than the original video program. For that matter, the path information indicates forthwith that no further video information need be reproduced any more. Alternatively, it is possible to record a type indication for each section, for example, start section, middle section or end section.

Figure 4:
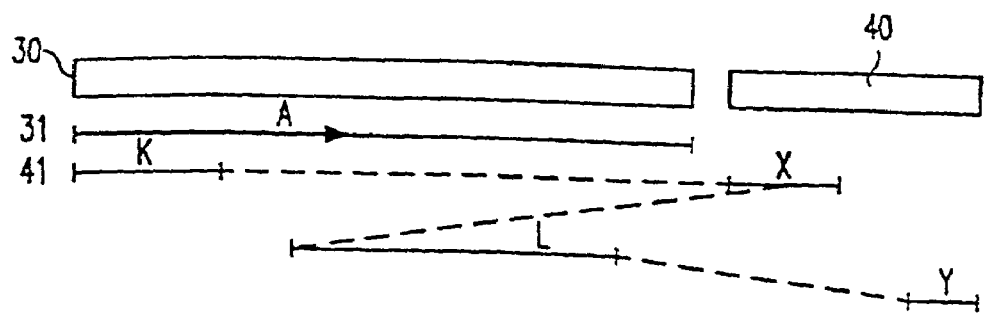
FIG. 4 shows a video program and additional video information as well as a path.

FIG. 4 shows a video program subdivided into two parts, that is, basic video information 30 and additional video information 40. Thus, additional video information 40 is recorded in addition to the original video program 30. The original version is indicated by the basic path 31 and section A. This basic version can also be played back on a simple device that lacks the means for recovering the path information. Sections K and L are indicated in the original video program, and the sections X and Y are indicated in the additional video information 40. A selective version of the video program is indicated by part 41, formed by the sequence of sections K, X, L and Y. Such a path thus includes at least one section of the additional video information. This develops an alternative version of the video program, for example, a happy ending, or an extended version according to the director's personal taste, a "director's cut." It is also possible to assemble modified versions for specific countries, religions, habits or political ideologies.

The linking information makes a direct jump possible when the end of a section is displayed, so that a substantially continuous picture display is obtained. When a tape is used as an information carrier, the beginning of the next section may be reached with only a brief interruption of the video program by "fast forward". In the case of a disc a brief jump in radial direction to the initial address of the next section is possible. A continuous display is realized if shortly before a jump a buffer is loaded with video information displayed during the jump. For that matter, the position of the next section to be displayed is known.

A suitable embodiment of the linking information is a Table in which any possible subsequent sections are stored for each section, as is indicated at 32 in the first example. At section B there is indicated that sections C and D can be linked. Selection parameters such as a classification code may be assigned to each section and stored in the Table in addition to the initial and final addresses. A selection of a next section from the available linkable sections may then be derived from the selection parameters. Another embodiment of the linking information is a Table for each path with consecutive sections, in which sector addresses of the first and last sectors of each section are stored. Also the total number of sections, i.e. the length of the Table, is stored, so that the end of the respective version is known. For each video program the number of paths is recorded or a Table is included for a given fixed number of paths. In the latter case the Tables have a number of sections equal to 0 for unused paths. In another embodiment, the video information is segmented while a section is formed by one or more successive sections. A Table for a path then contains addresses of all segments which in the given order form a specific version. The segments may thus be recorded consecutively, so that it is not necessary to jump after each segment. In such a Table a section boundary thus appears from a jump.

The path information always contains at least linking information for consecutively displaying sections of video information. This linking information may directly indicate the addresses 22 of the respective sectors of the information carrier, but in another embodiment indicators for the sections are smaller segments, so that the video signal may be included consecutively in its stead. In that case, a separate Table of indicators and addresses of sections or segments is recorded. This Table then contains, for example, always a segment number and the initial and final addresses of the segment.

From that which precedes it appears that the playtime of the selective versions of the video program may have a playtime that differs from the original video program. For that matter, video material is skipped or added. In an embodiment of the information carrier, the playtime information is added to the path information. For example, the playtime is indicated for any possible path. It is also possible to include the playtime per segment or per section, while the total playtime can be calculated by adding up these playtimes for the respective version. This provides the possibility of reading the playtime of the version selected by the user from the information carrier and displaying same to the user.

In a disc-shaped information carrier as described with reference to FIG. 2, it is attractive to store path information in a file. Via the Directory Tables the information relating to a path may be located and read rapidly. After the information carrier is inserted into a player, the path information is available forthwith. On other information carriers and playback equipment the path information may be recorded in an area that is easy to locate, such as, for example, at the beginning of a tape. In another embodiment of the information carrier, the path information is recorded next to the respective video information spread over the carrier, as is described with reference to FIGS. 5 and 6. In consequence, the file need not constantly be located and read or, once read, be stored in a large memory in the player. After a jump, the respective path information can be read forthwith from the information carrier. Alternatively, it is possible to combine these embodiments in that the path information is recorded multiple times. A survey of path information is then available in a central file, whereas, besides, path information multiplexed with the video information is recorded.

Figure 5:
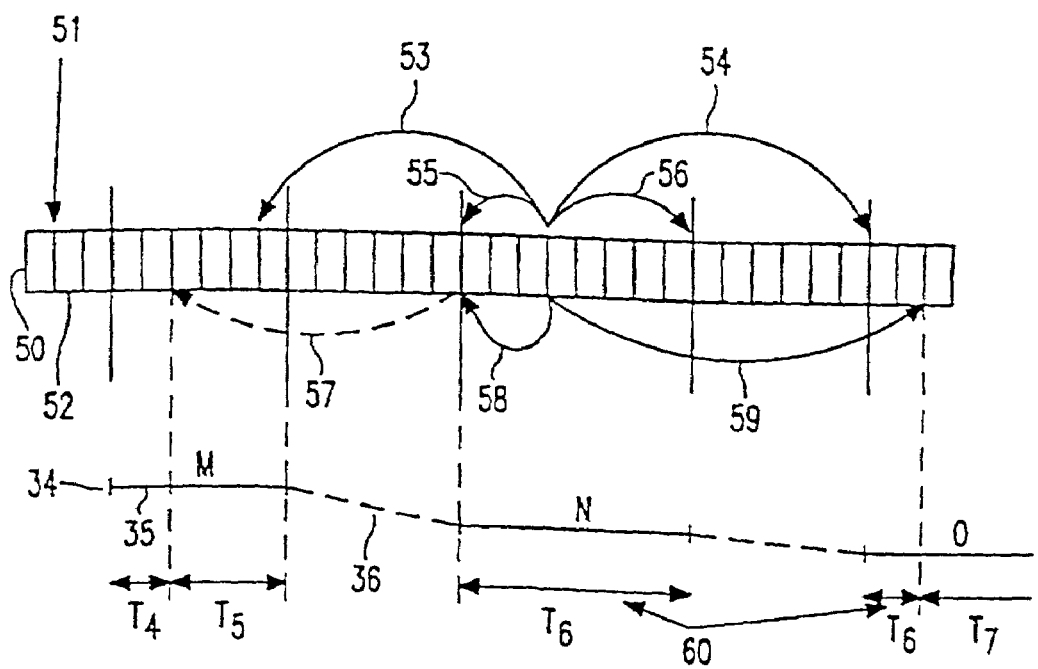
FIG. 5 shows a part of a video program with path information near to entry points.

FIG. 5 shows a part of a video program, in which the path information is indicated near to a specific point in the information stream. In this path information may be used absolute addresses for the jump instruction, but also relative jump addresses with respect to said point. An advantage of the relative jump addresses is that the servo means in the player may take account of the distance to be jumped. A path for a selective version is referenced 34. The video signal is coded digitally then, such as MPEG-2. For this coding, always a number of video frames are coded dependently by forward or backward computation (P-frame), or bidirectionally (B-frames) in the case of an independently coded frame (I-frame). Playback may then be started only from an I-frame and not from a dependent B or P-frame. The I-frame comprises an intra-coded picture, while the P-frame comprises a predictive encoding of a picture and the B-frame comprises a bidirectional predictive encoding of a picture. An I-frame alone, or along with a number of B-frames and/or P-frames may considered together as a group of pictures (GOP).

The video signal is subdivided into segments 52 which comprise each at least a single I-frame. The beginning of such segments 52 is designated by entry points 51. After an entry point 51, the video signal first contains an I-frame. This spacing of entry points 51 may vary; about two entry points per second of playtime is a usual number. In the case of a jump, always the sector address of an entry point 51 is taken as the destination address. In an embodiment of an information carrier according to the invention, also path information is recorded near to an entry point. Further description of entry points is available in Japanese patent application Hei-4-277956.

In FIG. 5 the path information is recorded as packets of control information in the segments 52 directly following entry points 51. The packets of the path information are marked as control information, for example, as Program Stream Map (PSM) packets in the manner customary for MPEG-2. Reference be further made to the ISO 13818-1 standard mentioned with reference to FIG. 1. ISO 13818-1 further defines a program stream directory (PSD) and a sector that includes both a PSM and a PSD is termed an entry sector.

An entry point may be defined by an entry packet provided directly ahead of the packet where the first I-frame of the GOP exists. The entry packet may be associated with an identification flag and position information regarding three neighboring entry points. Such position information may include the distance from the entry point to the neighboring entry point. Alternatively, an entry point may be defined simply by appending an identification code to a regular data packet.

By jumping from one entry point to a neighboring entry point, I-frames can be efficiently located to facilitate "high-speed search"-type reproduction operations.

The Program Stream Map according to the invention describes the contents of the information stream in descriptors. They are information structures describing the different information streams in the total multiplexed information stream, such as the video, audio or subtitle stream, but also, for example, the paths. An actual time code, tracks and sections are given for each path. Time codes denote the period of time elapsed since the beginning of the programme or track. Tracks denote a subdivision for the user of a total program and track numbers are denoted T4, T5, T6 and T7 in FIG. 5. In a path it is also possible for a jump to occur within a track, as is denoted by the arrows 60 at T6.

Figure 6:
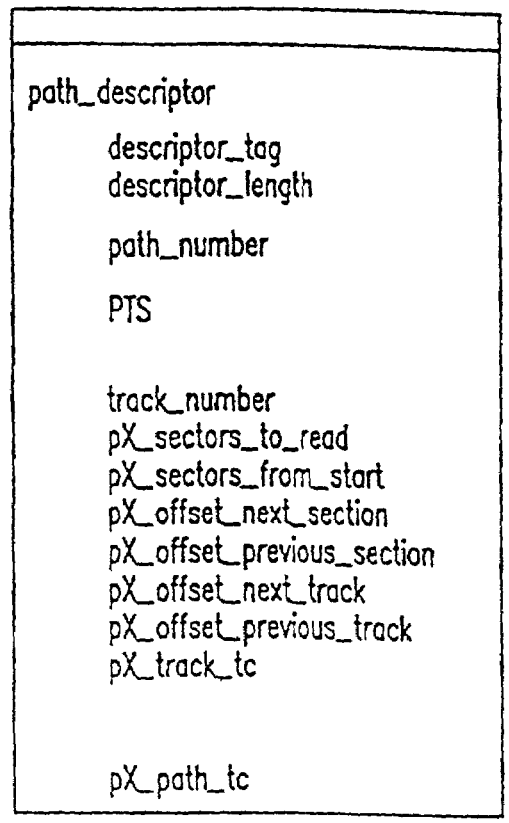
FIG. 6 shows a path_descriptor.

FIG. 6 shows an example of a path_descriptor of a path. A descriptor commences with a descriptor_tag which denotes the type of descriptor and a descriptor_length. The path_number denotes for which path the data in the descriptor are intended. The time codes pX_track_tc and pX_path_tc from the beginning of the actual track and from the beginning of the actual path respectively, are valid at a specific system instant denoted by the Presentation Time Stamp PTS in a manner customary in MPEG-2. The system time is also contained in the video signal, so that a proper synchronization between the various types of information may be achieved. After a jump, however, there may be a discontinuity in the system time, so that this system time is unsuitable for denoting the elapsed playtime. A track_number denotes the track number of the respective path.

A more complete definition of the path_descriptor( ) area is illustrated in FIG. 6A. The path_descriptor( ) area defines areas for various paths and describes the path number, track number, sector number, sector offset, track time codes and path time codes. Alternatively, areas for track number, track time codes, and path time codes may be defined in another area, such as a time_code_descriptor area for common definition for all paths.

Preferably, the path number (path_number) is a 3-bit value providing a path number which identifies the descriptor. The track number (track_number) is preferably a 16-bit value representing the current track number encoded relative to the program start position. The track number of a segment may be used by one or more paths and may be incremented via the path. The absolute track number may be determined from the relative track number and the track number offset stored in program_linkage area of the D_TOC area.

The sector number (pX_sectors_to_read) is preferably an unsigned integer indicating the number of sectors, inclusive, remaining prior to the end of the program section for the particular path. If the sector number (pX_sectors_to_read) is zero, then that sector is not a portion of that particular path.

The sector number (pX_sectors_from_start) is preferably an unsigned integer indicating the number of sectors between the that sector in the particular path from the start position of the current section. If px_sectors_from_start has a zero value then that sector is the first sector of the section. Preferably, a program is comprised of one or more sections and each section is comprised of one or more sectors.

The offset (pX_offset_next_section) preferably indicates the number of sectors in the particular path between the entry sector of the current section and the entry sector at the start position of the next section. If pX_offset_next_section equals zero, then the last section according to the particular path has been reached.

The offset (pX_offset_previous_section) preferably indicates the number of sectors in the particular path between the entry sector of the current section and the last entry sector in the immediately previous section. If pX_offset_previous_section equals zero, then the current section according to the particular path is the first section to be reproduced.

If pX_sectors_to_read, pX_sectors_from_start, pX_offset_next_section, and pX_offset_previous_section each equal zero then the particular path is not in use or the entry sector does not constitute a part of that particular path.

The offset (pX_offset_next_track) is preferably the sector offset from the current sector of the particular path to the entry sector of the start position of the next track. If pX_offset_next_track equals zero, then the current track is the last track of the particular path.

The offset (pX_offset_start_track) is preferably the sector offset from the current sector of the particular path to the entry sector of the start position of the current track. If pX_offset_start_track equals zero, then the current track is the first track of the particular path. If the current entry sector is the leading sector of the current track, then pX_offset_start_track represents the offset to the start position of the previous track.

The track time codes, indicated with the prefix "pX_track_tc", specify the relative time in units of hour-minute-second with respect to the starting end of a track. The starting end of the track of a particular path is defined as hour 0, minute 0, and second 0. Similarly, the path time codes, indicated with the prefix "pX_path_tc", specify the relative time in units of hour-minute-second with respect to the starting end of a path. The starting end of a particular path is defined as hour 0, minute 0, and second 0.

Figure 6B:
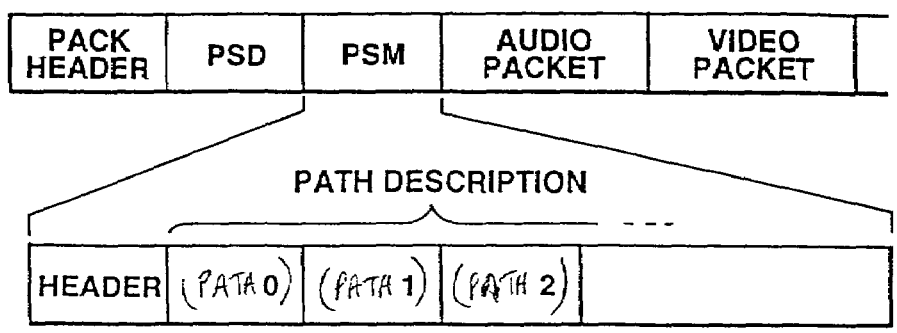
FIG. 6B shows a path_descriptor.

A path_descriptor( ) area as detailed above is provided in the PSM of the entry sector and includes time codes for each path. An illustration of the path descriptor( ) is shown in FIG. 6B. By storing the time code for each of the different paths in each entry sector, the exact elapsed time of reproduction of a particular path can be accessed from the path_descriptor( ) and displayed to the user concurrent with data reproduction and display. An accurate time indication is given for each particular path even though certain sections of data may be common to different paths. In an analogous manner, track numbers for each path may be included in the path_descriptor( ) area in the PSM of the entry sector.

Figure 6C:
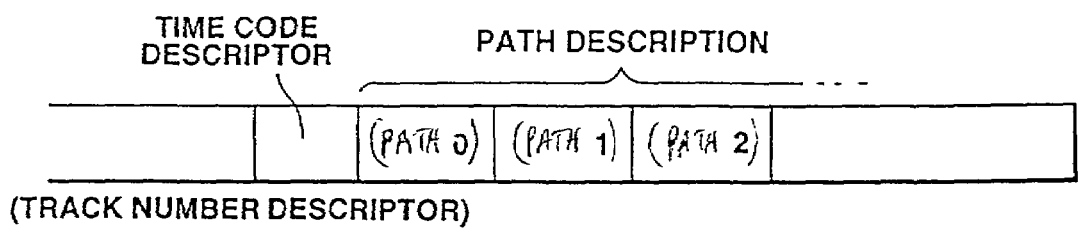
FIG. 6C shows a time_code_descriptor( )

Alternatively, a time code may be assigned, preferably consecutively, to each entry sector and stored in the time_code_descriptor( ) area of the particular entry sector as illustrated in FIG. 6C. A time code assigned in this manner may be used for searching scene indexing information and identification information. In an analogous manner, a track number may be assigned, preferably consecutively, to each entry sector and stored in an area of the particular entry sector, for example in a track_number_descriptor area.

When a video program is played, so-called trick modes are often used. The video signal may then be displayed in fast forward or in reverse mode. In the case of an MPEG-2 signal, always a number of sectors are skipped in such trick modes. In order to have this possibility also in a specific path, there is given in pX_sectors_to_read (in FIG. 5 arrow 56) how many sectors of the present section are yet to follow before the end of the section and, for the reverse mode, in pX_sectors_from_start (FIG. 5 arrow 55) how many sectors precede in the section. If the segment does not form part of the respective path, this may be denoted by a given value, for example, 0. In such case the path_descriptor for that path could also be omitted, but no address of a direct jump to a section of the video material that does belong to the selected path will then be available.

For a jump from the end of a section to the consecutive section, the distance to this section is denoted as pX_offset_next_section, in FIG. 5 arrow 54. With the last section of a path, a predetermined value may be given, for example, pX_offset_next_section=O. For a jump to the previous section in the case of reverse mode, the distance is given in pX_offset_previous_section, in FIG. 5 arrow 53. The last entry point in the previous section is then taken as the destination. The first section may be indicated by a predetermined value. Needless to observe that in another embodiment the first and last sections are indicated by separate flags. Alternatively, it is possible to include the path information in a descriptor not for each path but in a combination for all sorts of paths.

As stated above, it is customary to subdivide such programs for the user into tracks. The user can then rapidly obtain a survey of the course of a program and, if so desired, can jump to another part. A player will often know the operating functions "next" and "previous" for this purpose, or have a direct track number selection. In FIG. 5 the track numbers for the selected path 34 are referenced T4, T5, T6 and T7. Furthermore, there should be observed that the boundaries of a track generally do not coincide with the section boundaries, since violent or other selective scenes may occur anywhere in the program. In the given path 34 there is a jump to, for example, track T7 in section 0, but for another path the transition from T6 to T7 may lie in the area between sections N and 0. In the path_descriptor shown in FIG. 6 there is a direct jump address present in pX_offset_next_track, so that a jump to the proper entry point of the next track along the respective path is possible in a simple manner from any point, denoted in FIG. 5 by arrow 59. For a previous jump, the address is given in pX_offset_previous-track, in FIG. 5 arrows 57 and 58. In FIG. 5 the jump to a previous track for the first entry point of a section is denoted by arrow 57; at the further entry points is given the beginning of the actual track shown in arrow 58. The user may then jump back to the beginning of the present track and from there further back, if desired.

In a further embodiment of the information carrier there is also a descriptor present, similar to FIG. 6, for other information related to the video program, such as audio or subtitles, which descriptor indicates for which paths a certain stream is suitable. The descriptor contains, for example, a flag for each path. For example, with the same video material, bad language may be replaced by more acceptable language. In another path are then included the same video sections, but with a separate audio stream and/or subtitle stream, in which flags then indicate which stream is to be used for a selected path. The separate audio or subtitle stream may be present during the whole video program. The separate audio and/or subtitle stream, however, is only necessary during the sections in which it is used. During the rest of the video program they may be omitted. The playback device must then comprise means for selecting for each individual segment the audio and/or subtitle stream that belongs to the selected path. In another embodiment, parallel video streams may be included in which a similar arrangement of the descriptor with a flag for each path is then possible. This could be used, for example, for including various camera angles with the same audio and subtitles.

Figure 7:
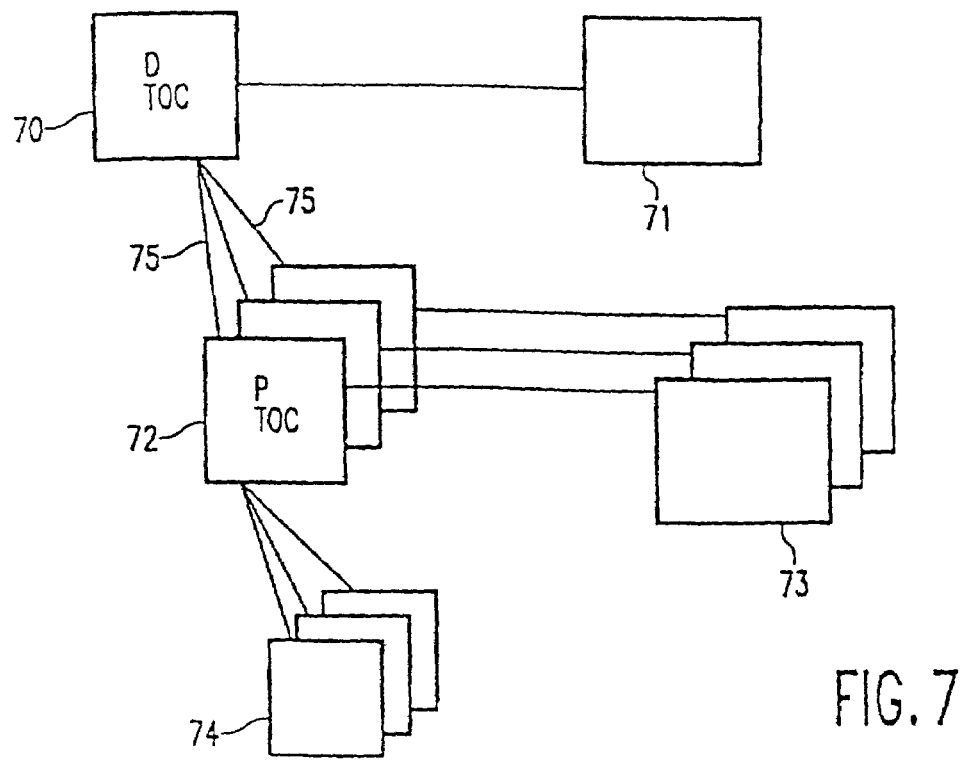
FIG. 7 shows a TOC structure.

FIG. 7 diagrammatically shows a possible structure of Tables Of Contents of an information carrier according to the invention. In a Disc Table Of Contents (D_TOC) 70 can be found information which is valid for the whole disc. This relates, for example, to a name of the whole disc and data about the origin. This Table Of Contents also includes a Table 71 containing data about the classification. This Table gives a number of classification or rating levels customary in a specific country, in the language of that country and links thereto a definition_number. For example, 0 then denotes "no rating" and the number increases with the rating level. D_TOC is also an indication of the number of video programs on the information carrier and of the references to the respective Program Tables Of Contents (P_TOC) 72 indicated by lines 75. P_TOC includes, for example, information about the paths in one or more path_tables 74, so that this path information is thus easily locatable, as was described with reference to FIG. 3. The P_TOC 72 also includes a Table 73 in which a rating_definition number is given to the respective program per country and per path, which number corresponds to a definition number defined in the D_TOC 71. Also a name for the respective program is included per path and per country, so that the various possible versions may be distinguished by the user. In this manner, the name and the rating of a specific version of a video program can be given in the language country to which the playing device is set. It is also possible to block rating levels starting from a certain level in the player, so that the parents can allow their children to watch only video programs up to a specific rating. They can then utilize the indications customary in their country. However, it is still the responsibility of the supplier of the video program to assign the correct rating levels and record them on the information carrier in Table 73.

The described way of classifying the rating levels is only an example. Another embodiment of a rating system is, for example, assigning a rating directly for each path. The weight of the rating codes is established beforehand. It is also possible to include one or more classification codes per segment, which codes denote the weight of the whole, or the weight for each category, such as sex or violence. When a next section is selected, the user-selected preferences on the player can then be taken into account.

As denoted by lines 75 in FIG. 7, it is possible to record a plurality of video programs on an information carrier. Customarily, an information carrier is subdivided into tracks which have an (absolute) track numbering, for example, starting from 1. However, to a user it is annoying if the subdivision into tracks counts on during the various programs. The third program could then start, for example, at track 29. Therefore, it is attractive to apply relative track numbers starting from 1 to each video program. If so desired, it is also possible to make different track subdivisions per path.

In an embodiment of the information carrier, the D_TOC 70 includes a Table stating for each available path a list of initial and final addresses, a last entry point, a playtime and a final system time of each track. It also includes for each track a track number and a program number, so that the assignment of the track number within each program is completely free. The user can then jump directly to a specific track of a specific program.

Another option is to include program linkage information in the D_TOC 70, which contains for each of the possible paths, for example, for each program, the first track number, the last track number and the addresses of these tracks. As a result, the user may be shown the total number of tracks in the version of the video program selected by him. It is also possible for the user to jump directly from one video program to a next video program.

In an embodiment of the information carrier, a relation from the first track of the video program to an absolute track number into which the information carrier as a whole is subdivided, can be established in D_TOC 70 or P_TOC 72. For example, an offset which is to be added to the relative track number to obtain the absolute track number, is to be included for this purpose. Track boundaries of relatively numbered tracks are then to be equal to track boundaries of absolute tracks.

In another embodiment, the P_TOC 72 includes a Table of track information. For each available path are included initial and final addresses per track, a last entry point, a playtime, an end-of-system-time and a track number, so that the assignment of track numbers is again completely free. The P_TOC 72 also includes the number of tracks per path for each program. The track subdivision is completely independent of the track subdivision of further video programs. Another option is to let a Table have a track number for each consecutive segment of a specific section.

In another embodiment, track information is embedded in the video stream, for example, included in the path information as described with reference to FIGS. 5 and 6. In FIG. 6, track_number is the track number for the respective path valid for the selected version of the respective video program. Via this facility the user can be simply shown a track numbering in his version of the video program. As denoted by arrows 57, 58 and 59, also jump addresses to subsequent and previous tracks and the beginning of the actual track are embedded in the video stream.

Figure 8:
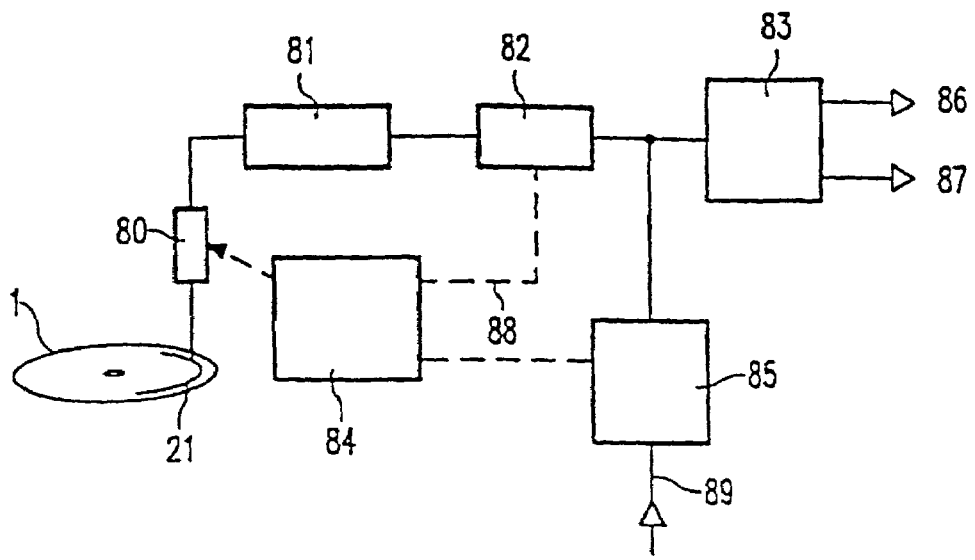
FIG. 8 shows a device for reading an information carrier.

FIG. 8 shows a device for reading an information carrier 1 according to the invention such as, for example, a Multi Media Compact Disc (MMCD). The device comprises scanning means 80 for scanning the track 21 by an optical beam. A description of similar reading of a CD may be found back in the title mentioned with reference to FIG. 2. The scanned signal goes to means 81 to be demodulated and error corrected. From there the signal goes to a buffer 82 where a monitoring signal 88 is generated indicative of the degree of fill. The control means 84 displace and focus the scanning means 80 for reading the desired sectors from the information carrier 1. The monitoring signal 88 goes to the control means 84 which, as required, read picture information from the information carrier to maintain a sufficient degree of fill for the buffer 82. As a result, the video and audio signal are continued as uninterruptedly as possible during jumps. The information signal from buffer 82 goes to a decoder 83 for the reproduction of the video signal on output 86 and the audio signal on output 87. The information signal also goes to means 85 for the recovery of the path information. The means 85 receive through an input 89 information about the path to be selected. This may be manually selected directly by the user on the basis of the available versions, or a specific permitted rating level may be set on the player (for example, by the parents), which can only be deviated from after a code has been keyed in. The path information is read out prior to the reproduction of the video program and stored in a memory, or, each time when path information is necessary, read directly from the file on the information carrier. After a section has been read completely, the consecutive section will have to be known to the means 85. The path information is indicative of sections to be displayed consecutively, as described with reference to FIGS. 3 to 6. Jump instructions are derived therefrom and passed on to the control means 84. Once the jump has been completed, further picture information is read from the buffer 82. During the jump, no new picture information reaches buffer 82 for a while, but the picture display may continue uninterruptedly as a result of the information still present in the buffer. As a result, a continuous series of consecutive sections is displayed along a path as indicated by the path information.

If the buffer 82 contains insufficient video information for bridging the jump, it is possible to show on a display (for example, the TV screen) the (estimated) period of time that is necessary for reaching the next section to be displayed. If so desired, it is possible to show a diminishing time value, an hourglass, or shrinking time bar. If one only needs to wait for a brief period of time, it is also possible to show the last image of the present section on the picture screen as a still picture until the new section is displayed.

In an embodiment of the reading device, the playtime of the video program can be shown to the user, for example, on the picture screen or on a separate display. For this purpose, means 85 are adapted for recovering the playtime information of the information carrier, so that the playtime of the program or of the track is shown for the selected path.

In an embodiment of the reading device, an information carrier having a picture signal with entry points is used as described with reference to FIG. 5. The means 85 then recover the control information multiplexed with the video stream and then recover the path information from this control information. In the reverse mode, addresses of segments preceding the actual section are used for determining the jump addresses. It is also possible to show the time elapsed per path or per track, if the information carrier contains the respective time codes.

In other embodiments of the reading device, a buffer 82 which is present, for example, on an analog video disc, is absent. In that case, there are brief interruptions of the video and audio signal. A reading device can either comprise a decoder 83 of its own, or the information signal may be applied to a decoder in another display device. In another embodiment, the reading device comprises a picture screen on which the picture is displayed directly.

Figure 9:
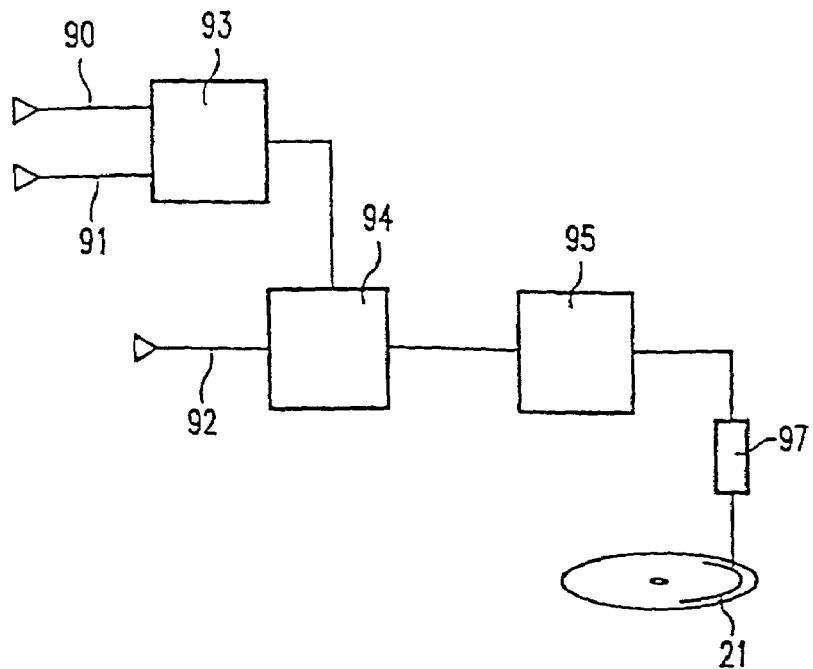
FIG. 9 shows a device for providing information carriers.

FIG. 9 shows a device for providing information carriers of said type, such as a CD or a MMCD. Firstly, a master information carrier 97 is made by said device. From this master information carrier 97 are then produced a multiplicity of information carriers by a customary process of moulds and presses (not shown). The picture information is applied to the picture encoder means 93; tile video information through an input 90 and the audio information and further information through a separate input 91. The picture encoder means 93 code the video information and the further information and generate the information signal. Information about sections, classification codes and paths to be selected is applied through input 92 to path information generator means 94 which add the path information described with reference to FIGS. 3 to 6 to the coded picture information. The channel coding unit 95 codes the information signal in a manner customary for the disc-shaped carrier and passes it on to a write unit 96. Write unit 96 writes, for example, by a high-intensity laser beam, the coded information signal on the master information carrier 97. A customary type of system controller (not shown) provides a control of the speed of rotation of the disc and the positioning of the write unit over track 21 to obtain the desired pit and track density. For a further description of the CD system, reference be made to FIG. 2 of said title.

In another embodiment, a similar device is suitable for recording the information signal on an information carrier which can be played back forthwith, such as a CD recordable. Another embodiment of this is, for example, a device for writing and reading a VCR tape or an optical tape. In a further embodiment it is possible to add the path information at a later stage, for example, for making various versions of a home video. The complete basic program has then been recorded previously and the path information is determined afterwards and added, for example, in a separate file.

Figure 10:
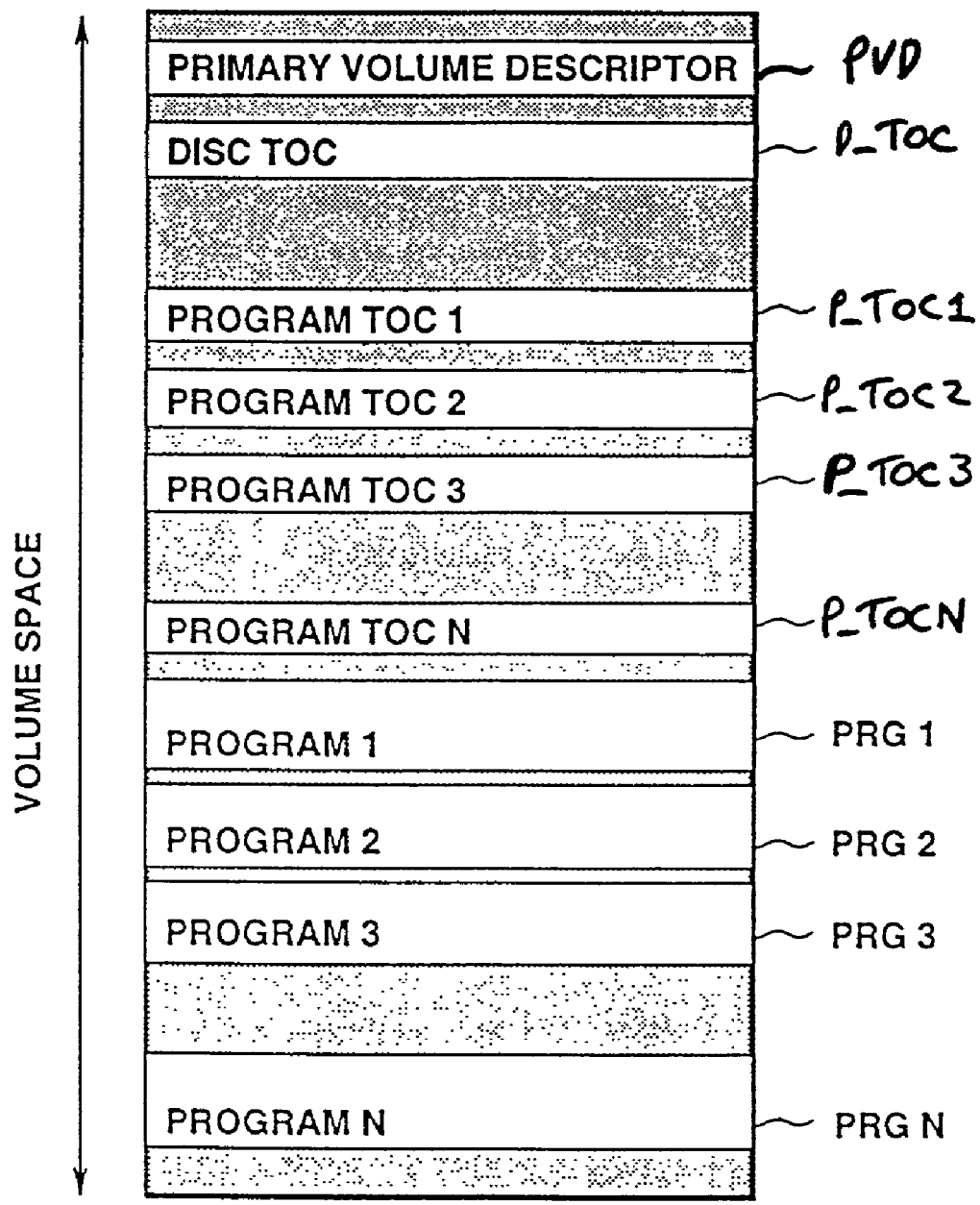
FIG. 10 shows a data format for recording information on an information carrier.
Figure 24:
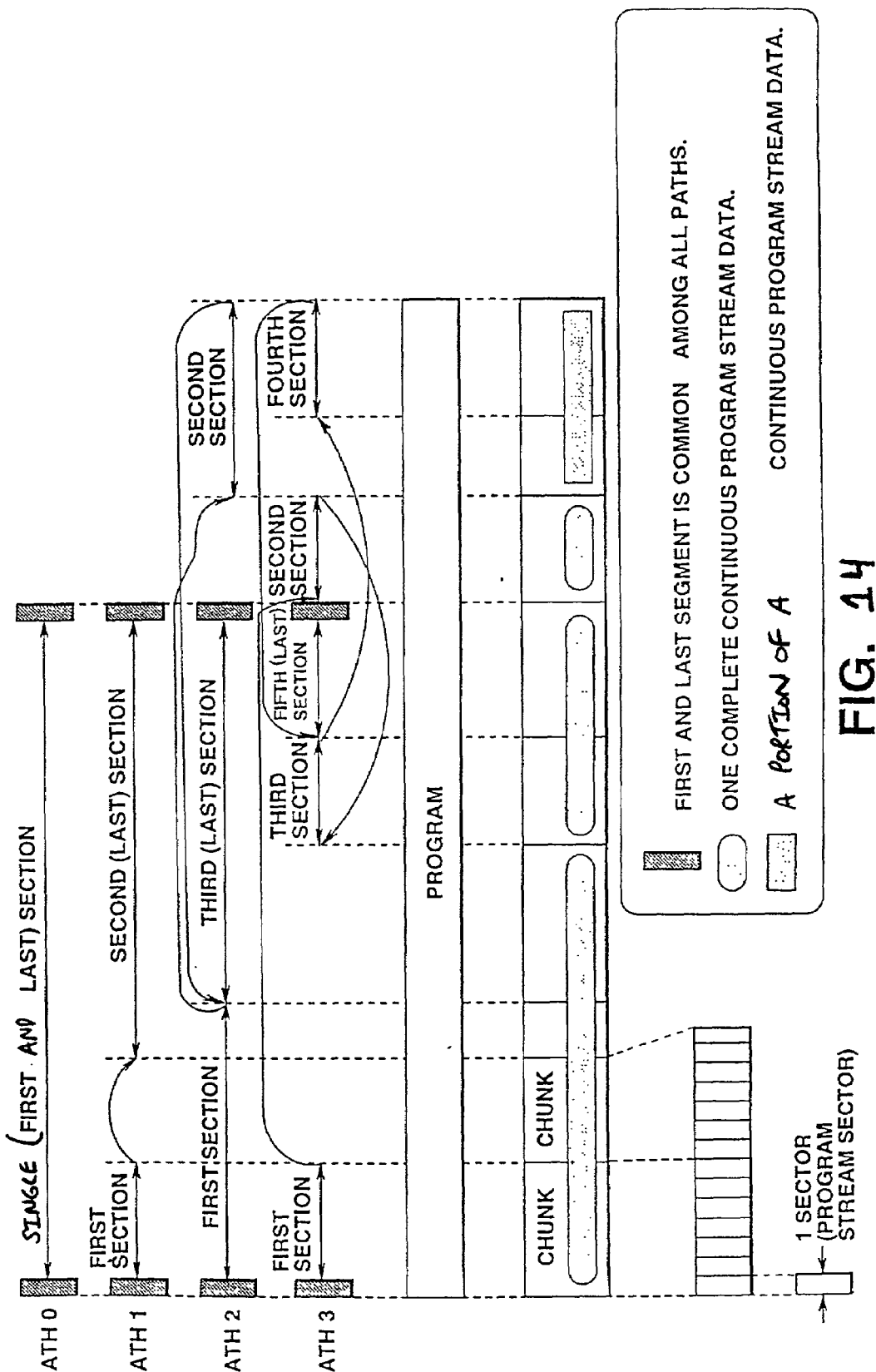
FIGS. 24A and 24B show different arrangements of video data.

FIG. 10 illustrates a preferred format for the recording of information on an information carrier according to the present invention. As shown, the format includes a primary volume descriptor area (PVD), a disc table of contents recording area (D_TOC), multiple program table of contents recording areas (P_TOC1, P_TOC2, P_TOC3), and multiple program information recording areas (PRG1, PRG2, PRG 3, . . . PRGN). In the PVD area, primary volume descriptors, defined pursuant to ISO 9660, are recorded. An exemplary implementation of ISO 9660 is illustrated in FIG. 11.

A preferred syntax for a D_TOC area is illustrated in FIG. 12. A D_TOC area stores information regarding the contents of the information carrier. For example, the rating codes may be stored in the rating_definitions( ) area of a D_TOC area. Preferably, the rating_definitions( ) area include areas for storing the number of countries defining the rating (num_of_countries), a 2-byte country code (iso_country_code) as defined in ISO3166, a number of definition of the rating (num_of_definition), a number specifying the rating type (rating_type_number), and a letter string for specifying the rating type (rating_type_string) as defined in ISO646. Optionally, the syntax for a D_TOC area may omit a rating_definitions_offset area.

As illustrated in FIG. 12A, the disc_tracks( ) area may include areas for storing the number of tracks (number_of_tracks), program number (program_number), track number (track_number), logical sector address of track starting (start_lsa), logical sector address of the last sector of the track (last_lsa), and the logical sector address of the last entry sector in the track (start_es_lsa).

A preferred syntax for a P_TOC area is illustrated in FIG. 13. A P_TOC area stores information regarding the contents of the information carrier in a specific recorded PRGx area. Program information for each program 1, 2, . . . N is recorded in a corresponding program information recording area (PRG1, PRG2, PRG3, . . . PRGN). The program information for each program is divided into packets of program data. For example, path_rating_assignments( ) areas, program_tracks ( ) areas, entry_points( ) areas, and path_table( ) areas are included in a P_TOC area.

In path_rating_assignments( ) areas, areas are defined for a number of countries defining the rating (num_of_countries), a 2-byte country code (iso_country_code) as defined in ISO3166, and a letter string for specifying the path name (path_name) as defined in ISO646. The location of specific entry points may be stored in the P_TOC area to facilitate the selective reproduction of sections of the recorded program to form different versions comprising different sequences of recorded sections.

As illustrated in FIG. 13A, the program_tracks( ) area includes areas for the total number of tracks employed in each path defining the reproducing sequence (number_of_path_tracks), track number (track_number), relative sector address of track starting (start_rsa), relative sector address of the last sector of the track (last_rsa) and the relative sector address of the last entry sector in the track (start_es_rsa). A relative sector address ("rsa") may be determined relative to the beginning of the program. For example, the beginning of a program may be assigned an address of zero.

As illustrated in FIG. 13B, the path_table( ) area includes areas for the number of sections in the path (number_of_sections), the relative sector address of the first entry sector of the section, and the relative sector address of the last entry sector in the section (last_es_rsa).

FIG. 14 illustrates an example of the formation of different versions of a program by selectively reproducing different sequences of recorded sections of program information. Each version is produced by following a particular "path" which indicates the sequence of recorded sections that comprises the particular version of the program. According to the illustrated path 0, a program version is formed from a single section of program data which extends from a starting segment to an ending segment and includes a starting entry point and an end point. To facilitate explanation, each of paths 0, 1, 2, and 3 are shown sharing a common pair of starting and ending segments; the sharing of certain segments among different versions is not required.

In path 1 of FIG. 14, a program version is formed from two sections of recorded data wherein the start of each section is designated by an entry point and the end of the version is designated by an end point. As shown, the version defined by path 1 differs from that of path 0 in that a portion of data included in path 0 is not included in path 1. In path 2, a program version is formed from three sections of recorded data wherein the start of each section is designated by an entry point and the end of the version is designated by an end point. As shown, the version defined by path 2 differs from that of path 0 in that path 2 includes a portion of data not included in path 0, specifically the second section of path 2.

In path 3, a program version is formed from five sections of recorded data wherein the start of each section is designated by an entry point and the end of the version is designated by an end point. As shown, the version defined by path 3 differs from that of path 0 in that path 3 includes two portions of data not included in path 0, specifically the second and fourth sections of path 3, but omits a portion of data included in path 0.

Placement of a complete access unit, such as an audio frame, an I-frame, a P-frame, or a B-frame at the beginning and end of each section facilitates "jumping" of the reproduction operation from one section to another, allowing the uninterrupted reproduction of at least one of the video data or the audio data.

If at least one path, for example path 0, is comprised of only one section and is free of "jumps" then it may be reproduced with a simplified reproduction system not designed for "jumping".

In the MPEG system proposed in ISO/IEC JTC1/SC29/WG11, video data and audio data are divided into packets to form a video packet stream, also referred to as a "video packeted elementary stream," and an audio packet stream, also referred to as an "audio packetized elementary stream." The two streams are time-division multiplexed to produce a program stream. The elementary stream of the program stream is defined in a program stream map. The program stream is further processed for storage on an information carrier.

Figure 15A:
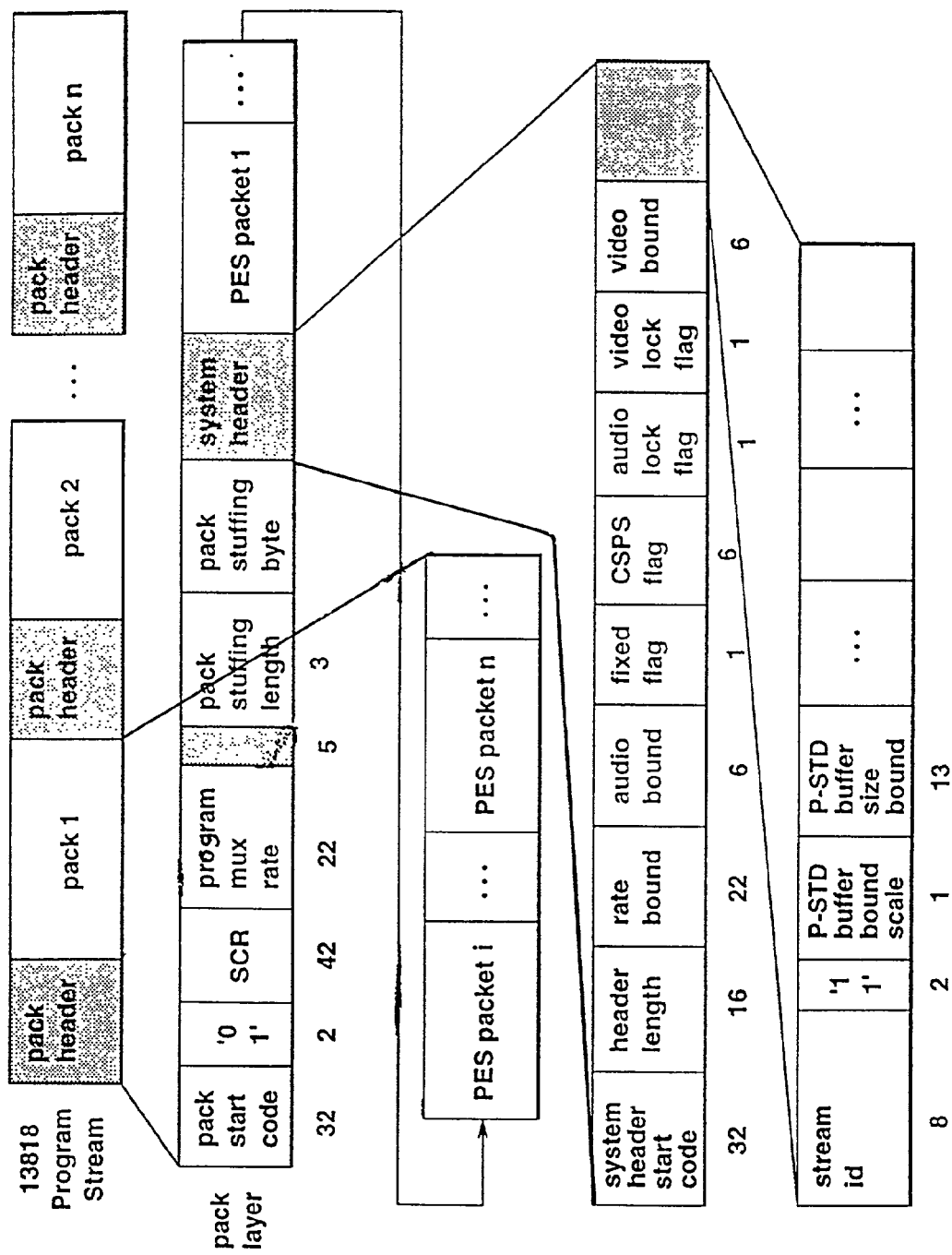
FIG. 15A shows a program stream.

FIG. 15A illustrates a preferred embodiment of the program stream. As shown, the program stream comprises a system header and at least one PES packet. According to the MPEG standard, the program stream includes a system layer and a compression layer. A pack layer and a packetized elementary stream (PES) constitute a system layer. Each multiplexed bitstream comprises one or more packs. Each pack includes at least one PES packet or a program stream map.

Typically, a pack comprises a header which includes areas for a pack-start-code, a system clock reference (SCR) or a program-mux rate, and a number of PES packets. Preferably, the pack-start-code is the 32-bit code 0x000001B4 (hexadecimal notation).

Figure 15B:
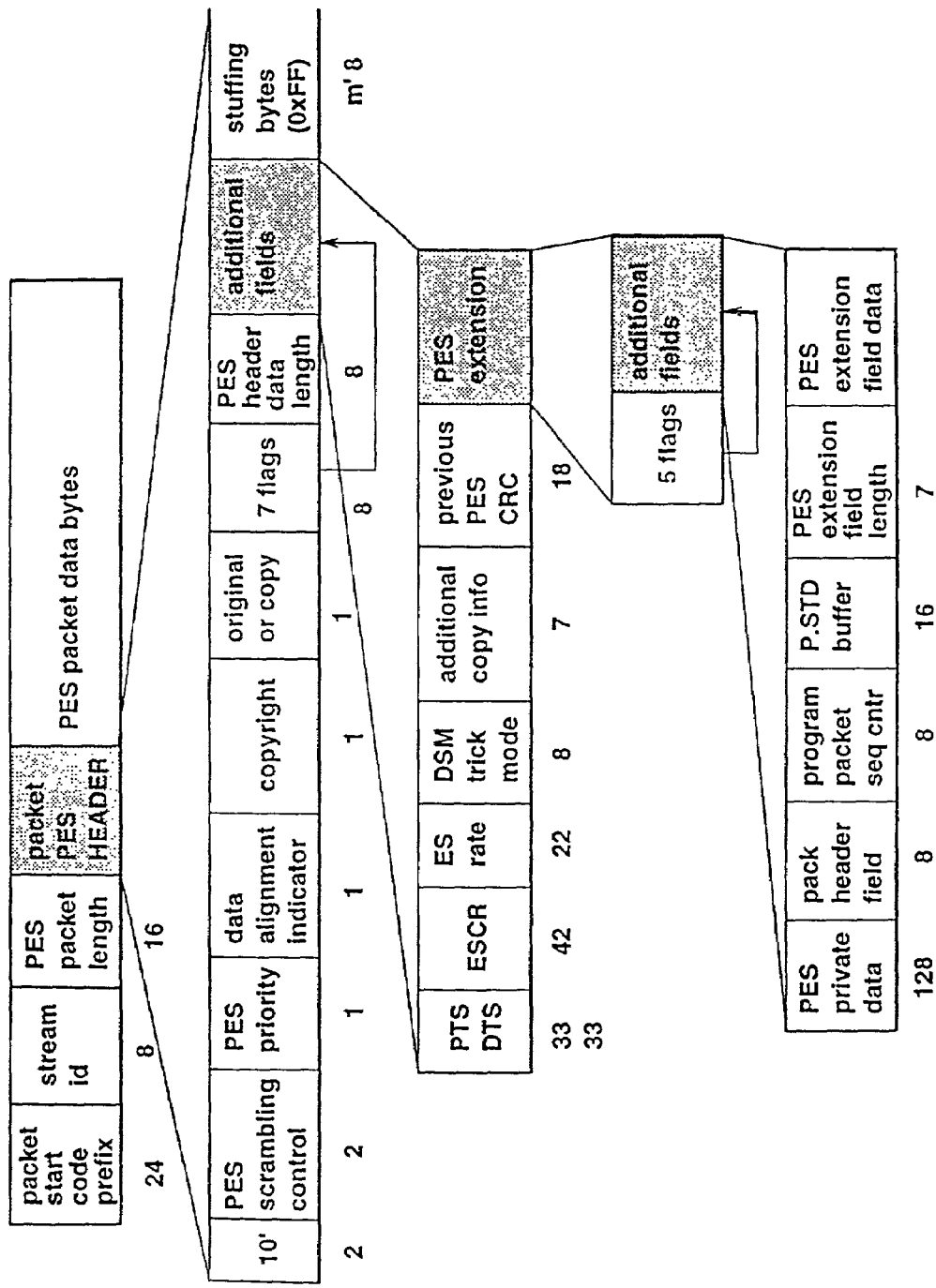
FIG. 15B shows a PES packet.

FIG. 15B illustrates the structure of a PES packet, while FIGS. 16A, 16B, 16C, and 16D, together show a preferred syntax for the PES packet. As shown, a PES packet includes a PES packet header and accompanying packet data. A PES packet header includes areas for a packet-start-code-prefix, a stream id, a PES-packet-length, and an optical-PES-header. The optical-PES-header includes a presentation time stamp (PTS) and a decoding time stamp (DTS). Preferably, the packet-start-code-prefix is the 24-bit code 0x000001 and the stream-id is an 8-bit code representing the length of a succeeding packet. PES-packet-length may vary up to a maximum of 2048 bytes. Preferably, packet data may be video data, corresponding to a video stream, or audio data, corresponding to an audio stream.

Advantageously, the above-described definition of pack and packet facilitates reproduction of multiplexed data from any sector of the information carrier on a random access basis.

Figure 22A:
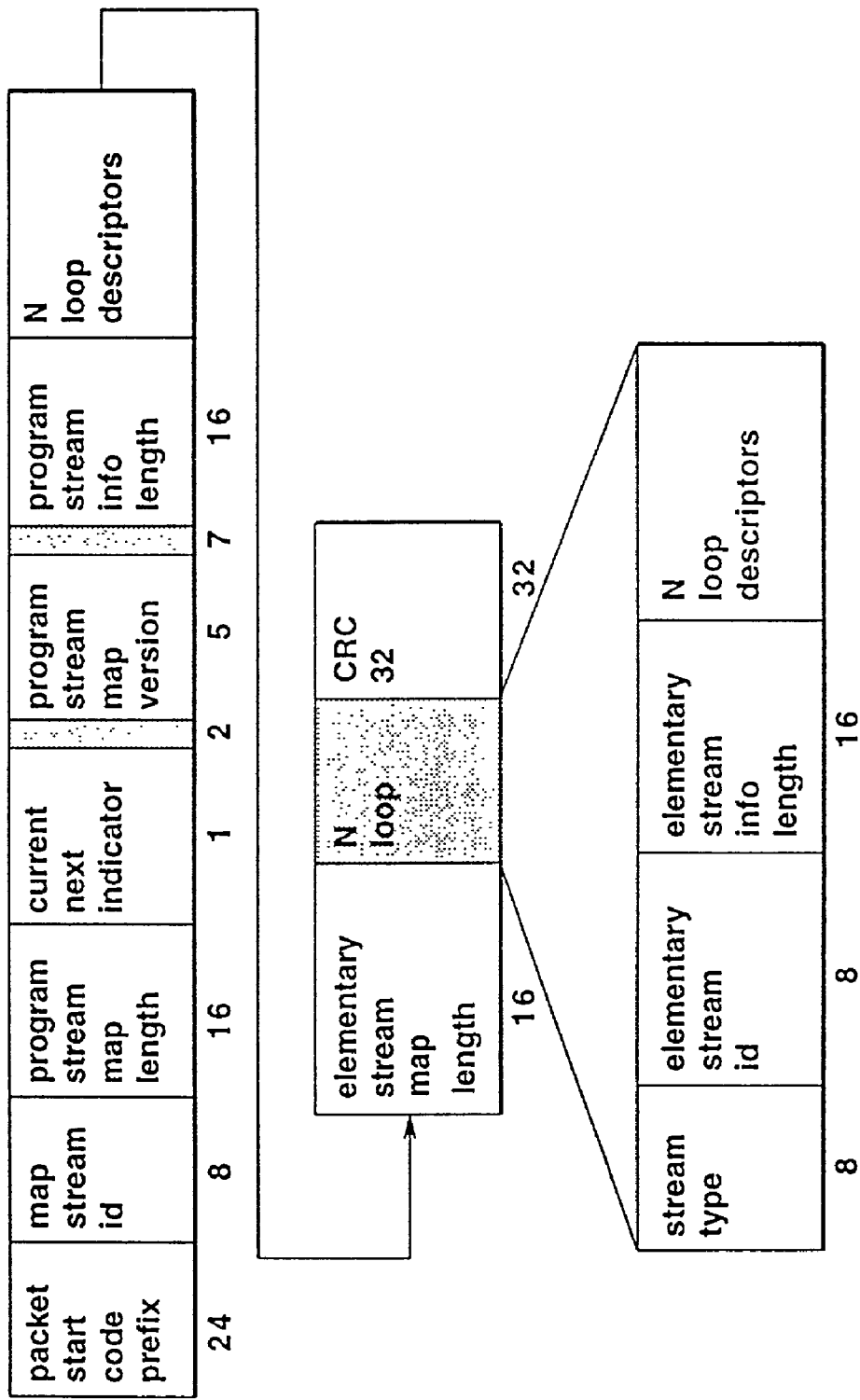

In accordance with the above, an entry point, implemented as an entry packet, may be described with two packets, a PSD packet and a PSM packet. In a PSD packet, the program stream directory (PSD) describes the current directory offset (previous directory offset) of the current PES packet. The PSD further includes the distances between the current PES packet and up to six neighboring entry points (three before and three after). The syntax and layout of a PSM packet is illustrated in FIGS. 22A and 22B. The PSM defines the elementary stream of the program stream, for example, the PES data type such as MPEG-video, MPEG-audio or the like is defined. The descriptor( ) area defined in the PSM packet may include a variety of descriptors including a path_descriptor or a program_descriptor.

Figure 17:
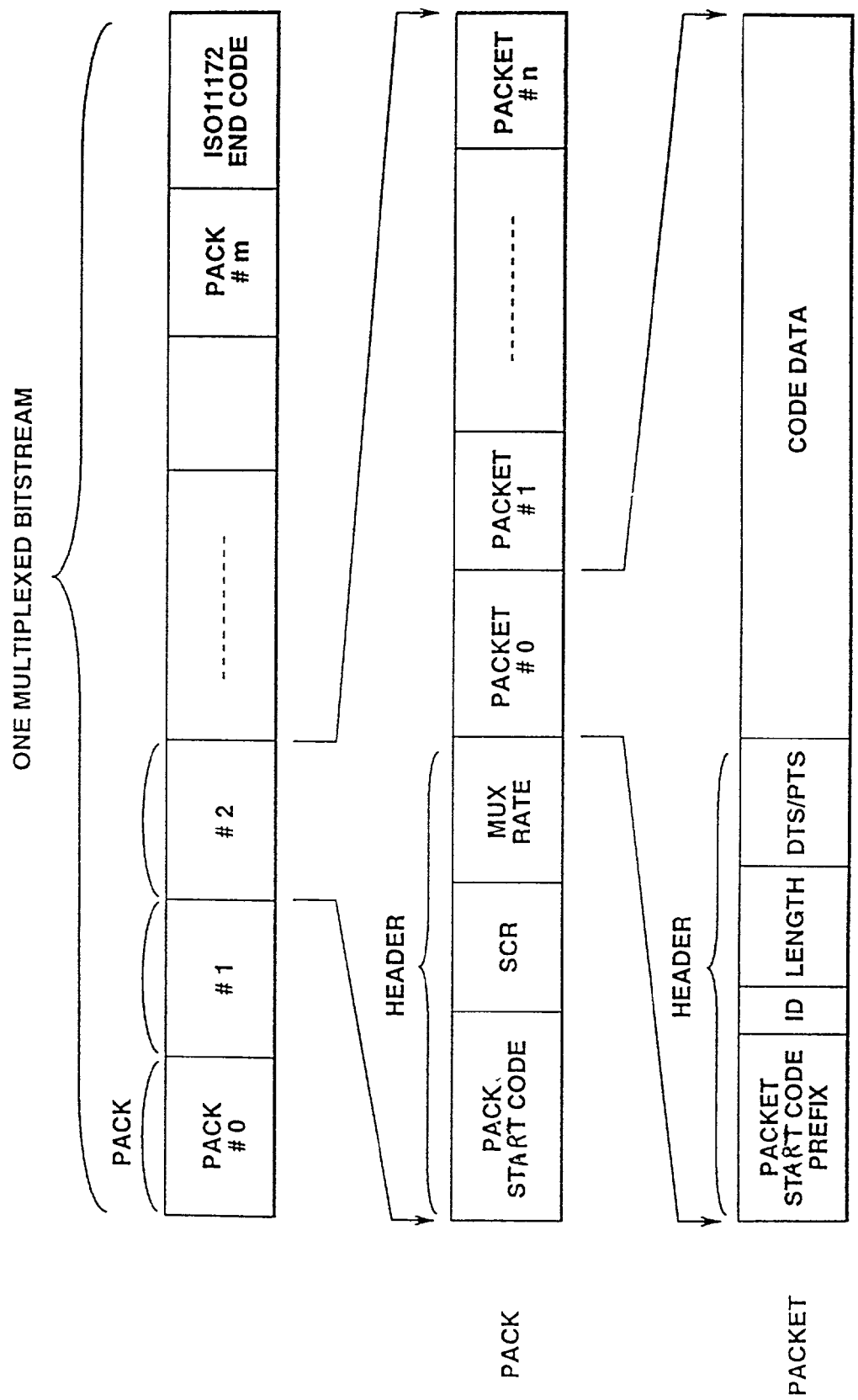
FIG. 17 shows a multiplexed bitstream.

In another implementation of the MPEG system defined in ISO11172 and illustrated in FIG. 17, each multiplexed bitstream is comprised of one or more packs and one ISO__11172_end_code. An ISO__11172_end_code is preferably the 32-bit code 0x000001B9 (hexadecimal notation). Each pack includes a header and one or more packets. The header includes a pack_start_code, preferably the 32-bit code 0x000001B4, and a system clock reference (SCR). Each packet includes a packet_start_code_prefix, a stream_id, a packet_length, a presentation time stamp (PTS), a decoding time stamp (DTS), and packet data. Preferably, the packet_start_code_prefix is the 24-bit code 0x000001. The stream_id represents the type of packet and the packet_length (16 bits) represents the succeeding packet length. This arrangement allows audio and video data to be multiplexed.

Figure 18:
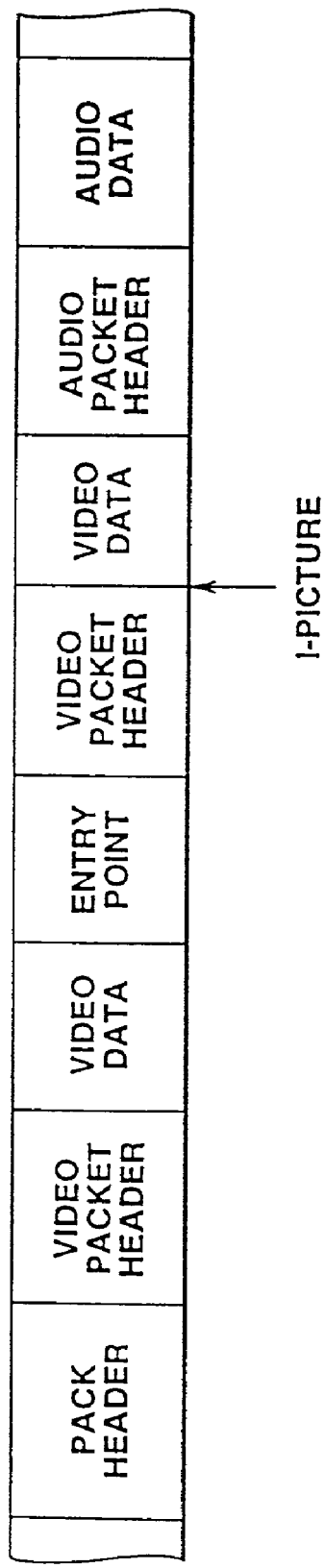
FIG. 18 shows a multiplexed bitstream that includes entry points.

FIG. 18 illustrates a multiplexed bitstream format which includes entry points. The format comprises, in order, a pack header, a video_packet_header, video data, an entry point, a video_packet_header, video data which includes an I-frame, an audio_packet_header, and audio data. A program stream directory (PSD) and a program stream map (PSM) are included in the entry point which is implemented as an entry packet. It should be noted that the entry point is positioned before the video_packet_header which immediately precedes the I-frame.

A sector having both the PSD and PSM recorded therein is referred to as an "entry sector."

Figure 19:
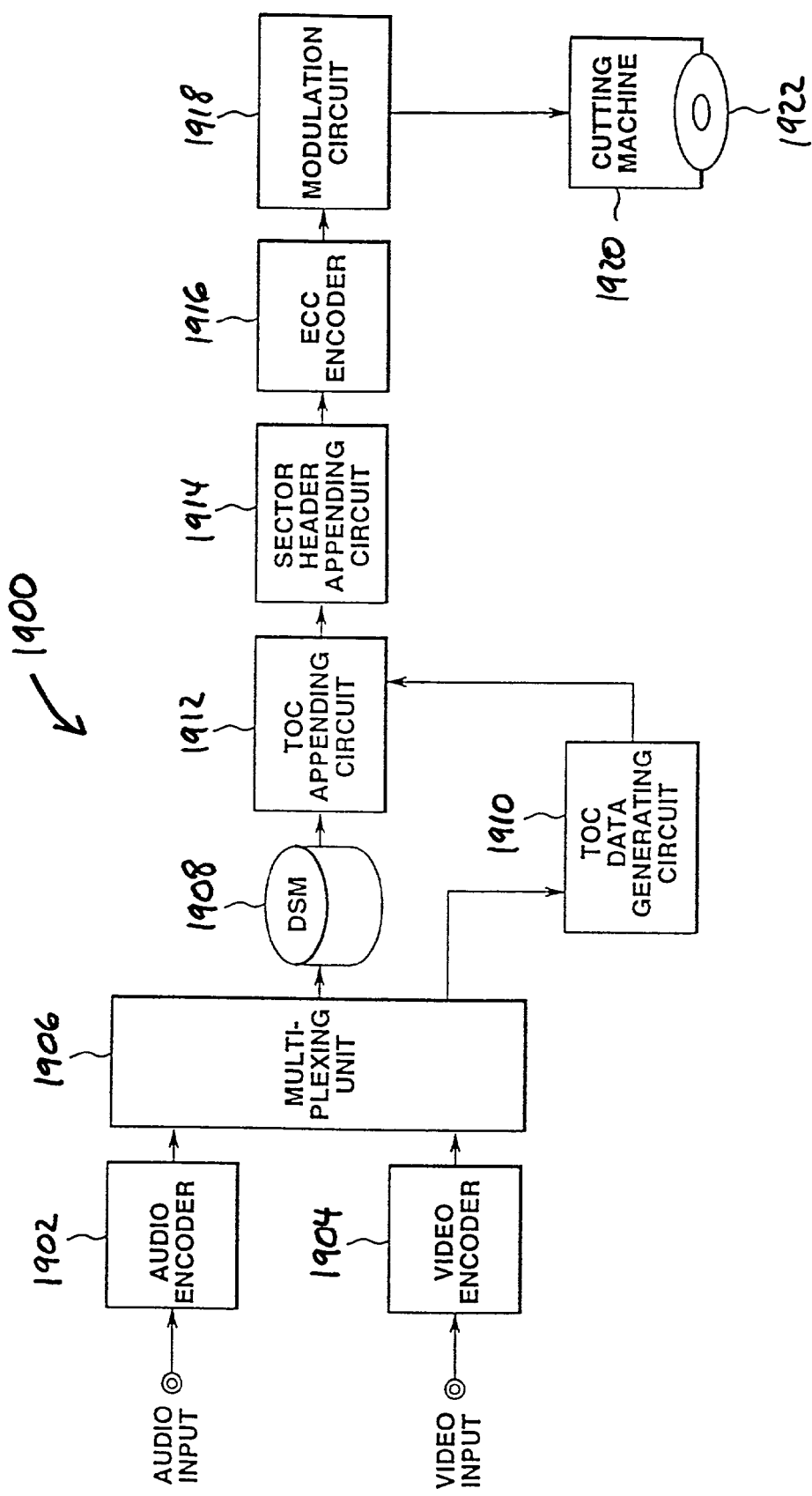
FIG. 19 shows a data recording device.

A data recording device implementing the above-described data formats is illustrated in FIG. 19. The recording device, indicated generally at 1900, receives audio and video input, packets the audio and video input, time-division multiplexes the packets, and records the stream of multiplexed packets on an information carrier. Recording device 1900 includes an audio encoder 1902, a video encoder 1904, a multiplexing unit 1906, a storage medium 1908, a table of contents (TOC) data generating circuit 1910, a table of contents (TOC) appending circuit 1912, a sector header appending circuit 1914, an error correction code (ECC) encoder 1916, a modulation circuit 1918, and a cutting machine 1920. Although shown in connection with a disk 1922, recording device 1900 may record data to any information carrier including, for example, a magnetic tape or disk, a magneto-optical disk, an optical disk, or a semiconductor memory.

Audio encoder 1902 and video encoder 1904 are conventional signal encoders which, for example, may perform compression encoding. Multiplexing unit 1906 multiplexes the encoded audio and video data and determines the locations of entry points in the data. A preferred embodiment of multiplexing unit 1906 is discussed below in connection with FIG. 20.

Storage medium 1908 stores multiplexed encoded audio and video data and may comprise any conventional data storage medium. Preferably, storage medium 1908 is a digital storage medium comprising a disk drive for reading to and writing from a magnetic disc, a magneto-optical disk or an optical disk.

TOC data generating circuit 1910 generates TOC data as a function of entry point information. TOC appending circuit 1912 appends TOC data to multiplexed data. Sector header appending circuit 1914 divides data into sectors and appends a header to each sector. ECC encoder 1916 is a conventional error correction code encoder for appending error correction codes to data.

Modulation circuit 1918 is a conventional signal modulator for modulating a signal suitably for utilization by cutting machine 1920. Cutting machine 1920 is a conventional data recording device for recording data on an information carrier.

In operation, video signals are supplied through the video input to video encoder 1904 and audio signals are supplied through the audio input to audio encoder 1902. Video encoder 1904 supplies encoded video signals to multiplexing unit 1906. Audio encoder 1902 supplies encoded audio signals to multiplexing unit 1906. Multiplexing unit 1906 supplies multiplexed encoded audio and video data to storage medium 1908 for temporary storage.

Multiplexed encoded audio and video data from storage medium 1908 are supplied to TOC appending circuit 1912 which appends TOC data to the multiplexed bitstream. The TOC data includes entry point information, e.g. sector addresses, regarding entry points in the multiplexed data and is supplied to TOC appending circuit 1912 by TOC data generating circuit 1910. The TOC data is generated by TOC data generating circuit 1910 from entry point data supplied from multiplexing unit 1906.

The multiplexed bitstream, incorporating TOC data, is supplied to sector header appending circuit 1914 which divides the bitstream into data sectors appropriately sized for storage in sectors of an information carrier. It is preferred that the bitstream is divided into 2048 byte sectors for storage in corresponding physical sectors of an information carrier. A sector header, preferably comprising 16 bytes and indicating the sector number of that sector, is appended to each sector of data. A pack or packet header is placed at the beginning of each sector.

The sectors of data are then supplied to ECC encoder 1916 which appends error correction codes, such as parity codes, to the sectors of data. The sectors of data, augmented with error correction codes, are supplied to modulation circuit 1918 for modulation to produce a modulated signal. The modulated signal is supplied to cutting machine 1920 for recording on disk 1922.

Figure 20:
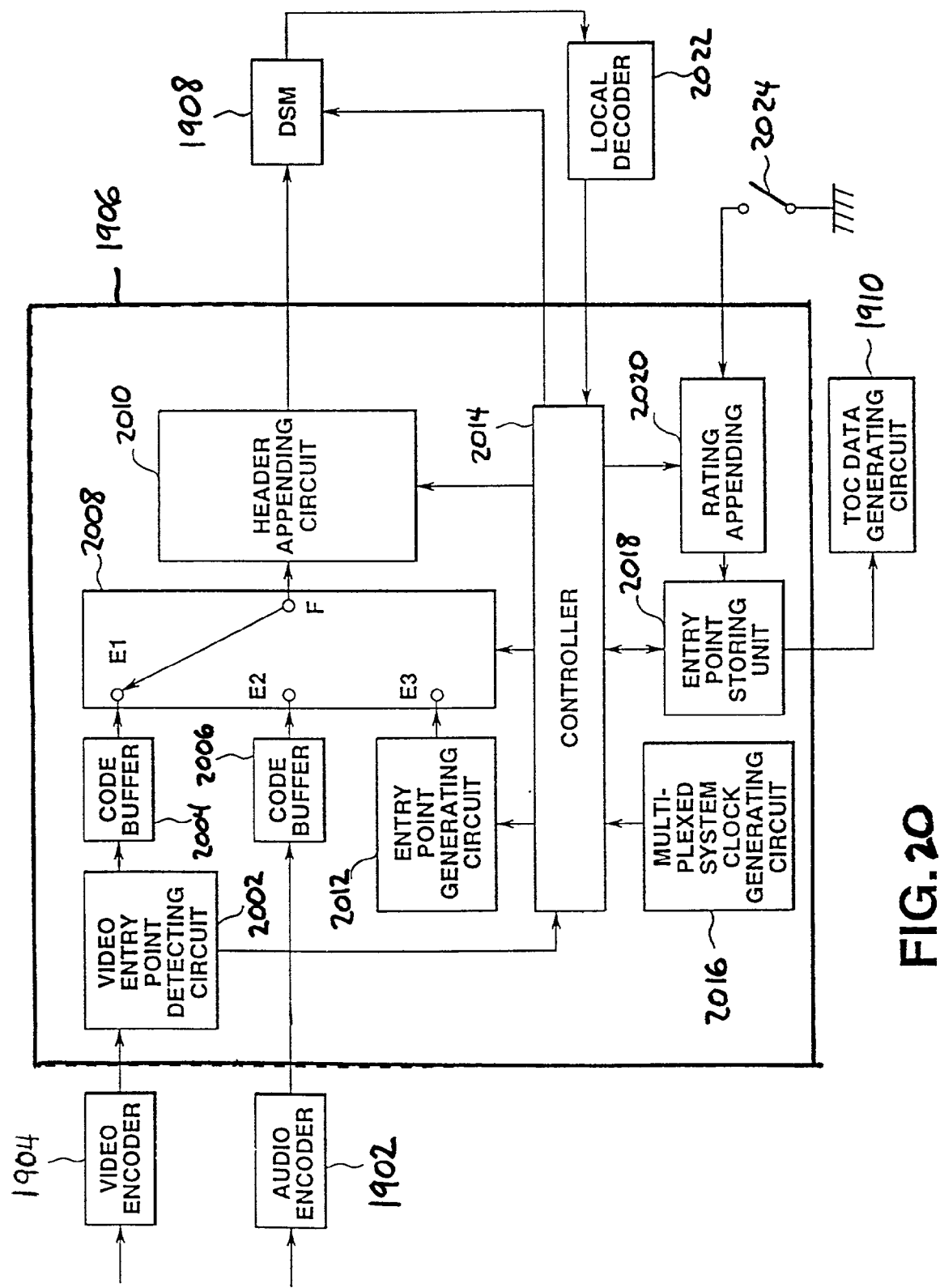
FIG. 20 shows a multiplexing unit.

FIG. 20 illustrates a preferred embodiment of multiplexing unit 1906. As shown, multiplexing unit 1906 includes a video entry point detecting circuit 2002, code buffers 2004 and 2006, a switching circuit 2008, a header appending circuit 2010, an entry point generating circuit 2012, a controller 2014, a multiplexed system clock generating circuit 2016, an entry point storing unit 2018, and a rating appending circuit 2020. Also shown is a switch 2024 and a local decoder 2022.

Video entry point detecting circuit 2002 detects the presence of I-frames in the encoded video data supplied from video encoder 1904 and generates an entry point generating signal in response to each occurrence of an I-frame. Alternatively, video encoder 1904 is coupled directly to controller 2014 and generates an entry point generating signal each time an I-frame is encoded. Accordingly, video entry point detecting circuit 2002 may be omitted.

Code buffers 2004 and 2006 and entry point storing unit 2018 are conventional data storage devices. Switching circuit 2008 is a conventional controlled switching device. Controller 2014 may comprise a microprocessor-based device. Multiplexed system clock generating circuit 2016 generates a system clock signal.

Rating appending circuit 2020 generates a path-descriptor for the current entry point. A programmer programs the rating appending circuit 2020 for each section that is incorporated into the reproduction sequence of a particular path and determines the section boundaries. Optionally, a switch 2024 (shown) is coupled to rating appending circuit 2020 and a local decoder 2022 (shown) is coupled to storage medium 1908 and to controller 2014. Switch 2024 and local decoder 2022 may be omitted when appropriate.

Encoded video signals are supplied by video encoder 1904 through video entry point detecting circuit 2002 to code buffer 2004. Encoded audio signals are supplied by audio encoder 1902 to coder buffer 2006. The output of buffer 2004 is coupled to terminal E1 of switching circuit 2008. The output of buffer 2006 is coupled to terminal E2 of switching circuit 2008. The output of entry point generating circuit 2012 is coupled to terminal E3 of switching circuit 2008. Output terminal F of switching circuit 2008 is coupled to header appending circuit 2010. Multiplexed audio and video data and header information, including specifically PSD and PSM information, is supplied from header appending circuit 2010 to storage medium 1908.

Controller 2014, responsive to the system clock signal, controls switching circuit 2008 to sequentially and periodically couple input terminals E1 and E2 to output terminal F. In this manner, encoded data is supplied from buffers 2004 and 2006 to header appending circuit 2010. Controller 2014 controls switching circuit 2008 to complete an access unit, such as an audio frame, an I-frame, a P-frame, or a B-frame at the jump point. This will be described in detail below in connection with FIGS. 23A, 23B, 24A, and 24B.

Circuit 2010 is controlled by controller 2014 to generate an MPEG-type bitstream from the encoded data. Specifically, header appending circuit 2010 is controlled to append a video packet header to video data supplied from buffer, 2004 and to append an audio packet header to audio data supplied from buffer 2006.

Controller 2014 receives the entry point generating signal and, in response, controls entry point generating circuit 2012 to supply a program stream directory and a program stream map to input E3 of switching circuit 2008. Controller 2014 controls switching circuit 2008 to insert the PSD and PSM directly before the video entry point (I-frame) by appropriately controlling the timing of the coupling of input terminal E3 with output terminal F. In this manner, the PSD and PSM are supplied to header appending circuit for multiplexing with the encoded audio and video data.

In the PSD of each entry point, the locations of the three entry points located immediately adjacent but before the respective entry point are stored in three prev_directory_offset areas. The locations of the three entry points located immediately adjacent but after the particular entry point are also stored in the PSD in three next_directory_offset areas. However, since the locations of future entry points may not be determined until such points are processed, such storage is deferred until the three succeeding entry points have been processed. Accordingly, controller 2014 controls entry point storing unit 2018 to store the location of each entry point. Actual storage of the entry point locations in each of the PSDs occurs following the storage of the multiplexed audio and video data in storage medium 1908.

After the video and audio data have been multiplexed and stored in storage medium 1908, controller 2014 accesses the location information stored in entry point storing unit 2018 and routes the location information to storage medium 1908. For each of the entry points stored in storage medium 1908, the locations of the three entry points after the particular entry point and the locations of the three entry points before the particular entry point are supplied from entry point storing unit 2018 to storage medium 1908 for storage in association with that particular entry point. Entry point storing unit 2018 also supplies entry point information to TOC data generating circuit 1910. In an alternate embodiment, actual storage of the locations of the three entry points preceding a particular entry point occurs concurrent with the storage of the multiplexed data.

Figure 21:
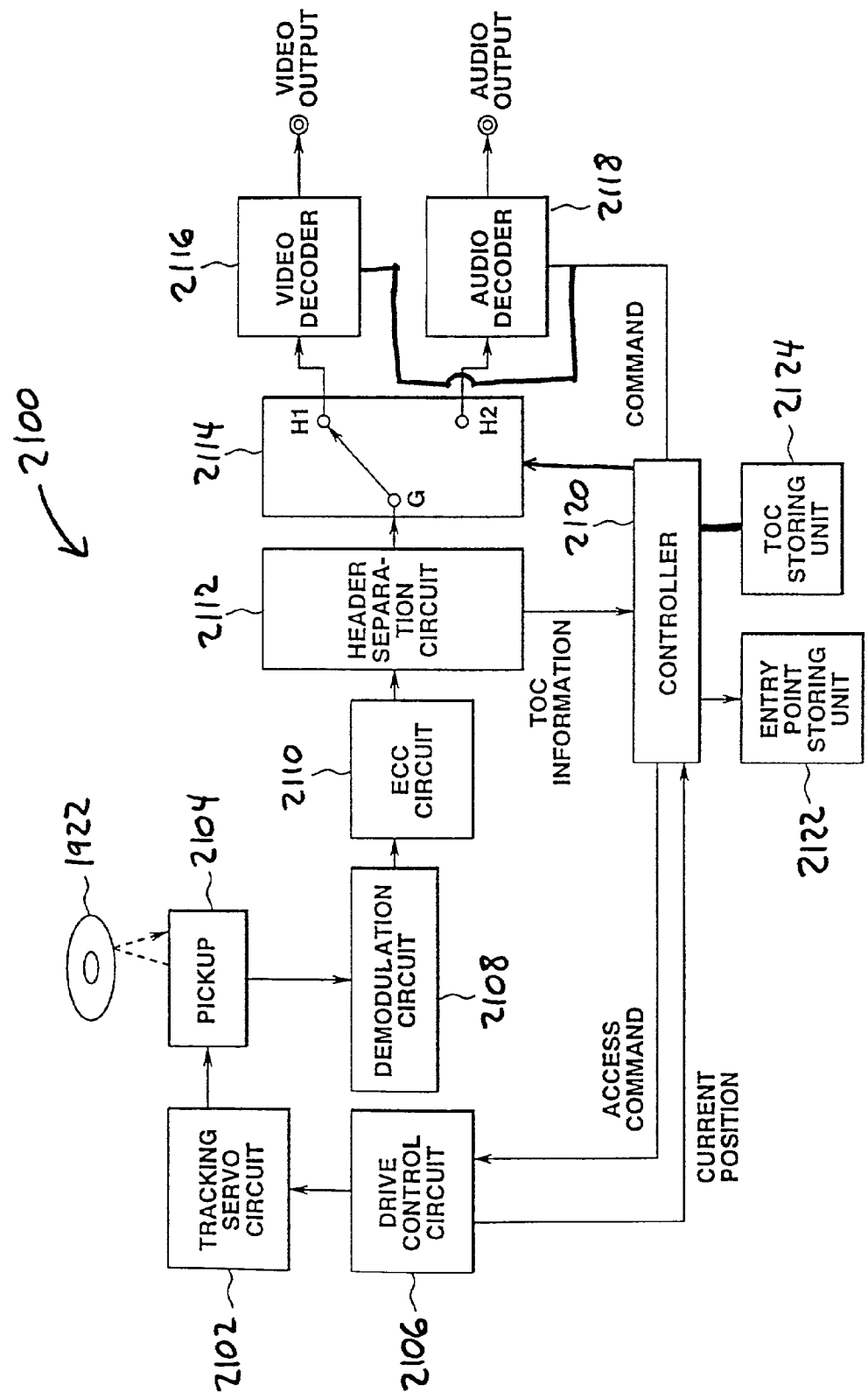
FIG. 21 shows a data reproducing device.

FIG. 21 illustrates another embodiment of a data reproducing device 2100 according to the present invention. Data reproducing device 2100 is comprised of tracking servo circuit 2102, pickup 2104, drive control circuit 2106, demodulation circuit 2108, error correction code (ECC) circuit 2110, header separation circuit 2112, switch 2114, video decoder 2116, audio decoder 2118, controller 2120, entry point storing unit 2122, and TOC storing unit 2124.

Pickup 2104 is a conventional pickup device for reading information from an information carrier. Preferably, pickup 2104 comprises an optical pickup for optically accessing data recorded on an optical disk. Similarly, tracking servo circuit 2102, drive control circuit 2106, demodulation circuit 2108, and error correction code circuit 2110, are conventional devices.

Entry point storing unit 2122 and TOC storing unit 2124 are conventional data storage devices. Switch 2114 is a conventional controlled switching device. Controller 2120 may comprise a microprocessor-based device.

In operation, controller 2120 issues a control signal to drive control circuit 2106 to read the leading sector on information carrier 1922. Drive control circuit 2106 drives pickup 2104 by means of tracking servo circuit 2102 to initiate reproduction of data from the leading sector on information carrier 1922. Pickup 2104 reproduces data from information carrier 1922 and supplies the reproduced data to demodulation circuit 2108. Demodulation circuit 2108 demodulates the reproduced data and supplies demodulated data to ECC circuit 2110 for error correction.

ECC circuit 2110 detects and corrects errors found in the reproduced data and supplies the error-corrected data to header separation circuit 2112. Header separation circuit 2112 separates TOC information from the error-corrected data and supplies the TOC information to controller 2120. Controller 2120 stores the TOC information in TOC storing unit 2124 and displays the TOC information to a user by means of a display unit (not shown).

In response to user input, controller 2120 issues a control signal to drive control circuit 2106 to initiate a reproduction operation. Drive control circuit 2106 drives pickup 2104 by means of tracking servo circuit 2102 to a position on the information carrier 1922 selected by the user. Controller 2120 also issues a control signal to video decoder 2116 and to audio decoder 2118 in preparation for data decoding. In accordance with the process described above, data is reproduced from the information carrier, demodulated, and error-corrected. The error-corrected data is supplied to header separation circuit 2112. Position information regarding the current position on information carrier 1922 from which data is being reproduced is supplied by drive control circuit 2106 to controller 2120.

From the error-corrected data, header separation circuit 2112 separates the pack header, packet header, program directory, program stream directory (PSD), and program stream map (PSM) and supplies such header data to controller 2120. The time-division multiplexed data which remains is supplied to input terminal G of switch 2114. Output terminal H1 of switch 2114 is coupled to an input of video decoder 2116 while output terminal H2 is coupled to an input of audio decoder 2118.

Controller 2120 stores entry point information included in the header data in entry point storing unit 2122. Along with each entry point is stored the location of the point as determined from the current position information supplied by drive control circuit 2106. The relative location of the entry points with respect to one another may also be stored.

Controller 2120 controls switch 2114 to sequentially couple input terminal G with either output terminal H1 or H2 in accordance with the stream_id included in the corresponding packet header. The time-division multiplexed data is thus selectively routed to either video decoder 2116 or audio decoder 2118, as appropriate.

In a reproduction operation, controller 2120 retrieves from TOC storing unit 2124 rating information stored in the rating_definition( ) area of the D_TOC area. Controller 2120 causes the display unit to display a list of countries having the particular rating definition and corresponding to the country code stored as part of the rating information. From this list, a user selects the appropriate country, e.g. the country in which the data is to be reproduced. The user enters the selection through a user interface, not shown, which transmits the user's selection to controller 2120. For example, the user interface may comprise an operating button located on reproducing device 2100 or a remote control device for controlling reproducing device 2100.

Following receipt of the user's selection of a particular country, controller 2120 controls the display unit to display a list of corresponding rating_type_number information and rating_type_string information. The user indicates the rating_type_number information which is to be allowed for reproduction and enters the selection into the user interface. The user interface transmits the user's selection to controller 2120. Following receipt of the user's selection of allowable rating_type_number information, controller 2120 retrieves path_rating_assignments( ) information included in P_TOC information from TOC storing unit 2124.

As a function of the country code and rating_type_number information selected by the user, controller 2120 determines from the path_rating_assignments( ) information the path_name information of an allowable path of reproduction. If only one path is determined to be allowable, reproduction according to that path is commenced by controller 2120.

If multiple paths are determined to be allowable, controller 2120 controls the display unit to display rating_type_string information and path_name information corresponding to the selected rating_type_number information. The user then selects among the path_name information and corresponding rating_type_string information for the path which is desired for reproduction and enters the selection into the user interface. The user interface transmits the user's selection to controller 2120 which controls reproducing device 2100 to reproduce the selected version of the video work according to the selected path. By the above-described process, a user selects among plural versions of a video work to select the version that has a rating which is consistent with the user's preference.

Alternatively, if multiple paths are determined to be allowable, controller 2120 may commence reproduction according to the path corresponding to the smallest path_number information. As a further alternative, a default path information may be prerecorded on the information carrier which is retrieved by controller 2120 which then commences reproduction according to the default path information. Preferably, such default path information is stored as path_rating_assignments information. Optionally, a default path information may be pre-stored in controller 2120.

In an alternate embodiment, reproducing device 2100 includes an input device (not shown), such as a switch, which may be set by a user to indicate the rating_type_number information which reflects the user's preferences. Controller 2120 accesses the user's preferences from the input device and initiates reproduction of the video work version that has a rating consistent with the user's preferences. The input device maintains the user's selection for future use by reproducing device 2100. Optionally, the input device may be positioned so as to be inaccessible to minor-aged persons, constructed so as to be too complicated to be operated by minor-aged persons, or otherwise locked to prevent or at least to deter reproduction of certain version of a video work.

In another alternate embodiment, rating_type_string information and path_name information, based upon rating_definition( ) information or path_rating_assignments( ) information, for every version of a video work recorded on the information carrier is displayed to the user by means of a display unit (not shown) controlled by controller 2120. Such an embodiment enables a user to choose from among all versions of the video work that are available on the information carrier.

In a reproducing operation, controller 2120 receives a command from a main controller (not shown) to enter into a rating mode. In rating mode, controller 2120 monitors data flowing through header separating circuit 2112. If a PSM is detected, controller 2120 monitors the data for a path descriptor. If no path descriptor is detected, straightforward data reproduction occurs.

Figure 23A:
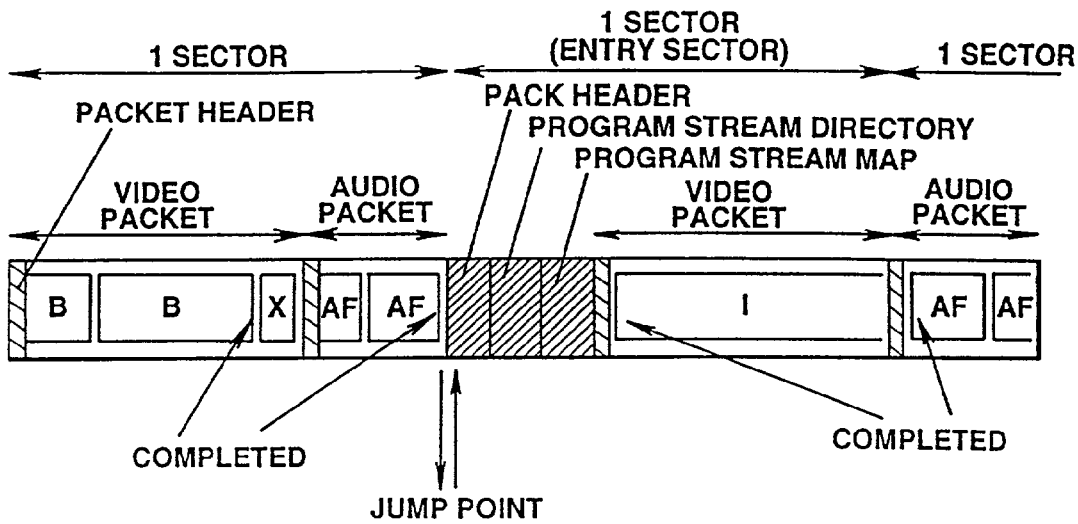
FIG. 23A shows a completed access unit.
Figure 23B:
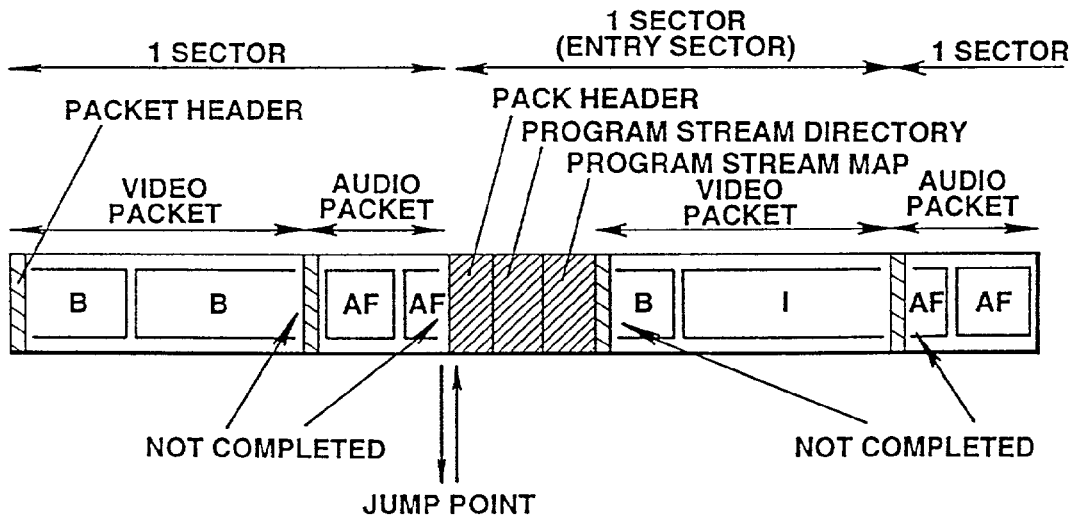
FIG. 23B shows an uncompleted access unit.
Figure 24A:
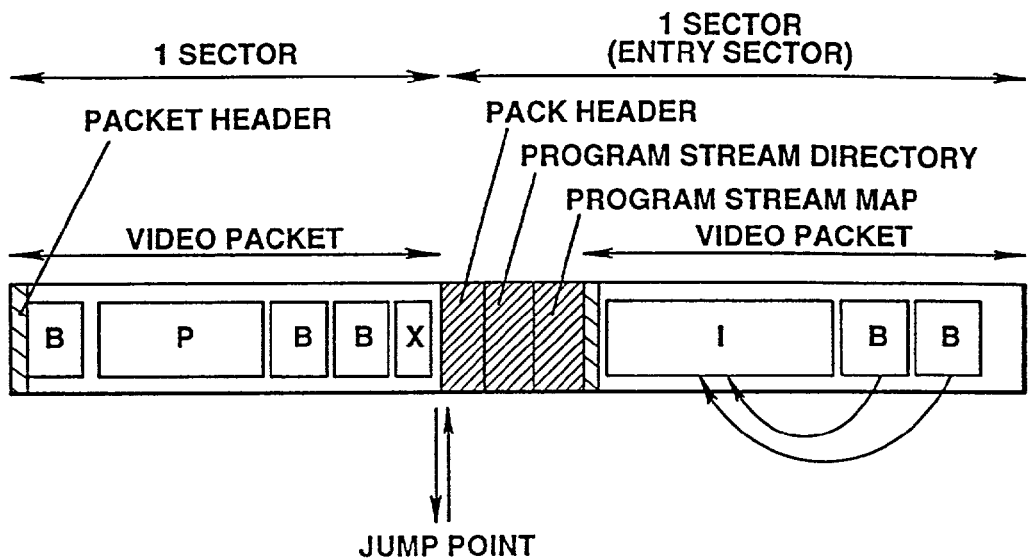
Figure 24B:
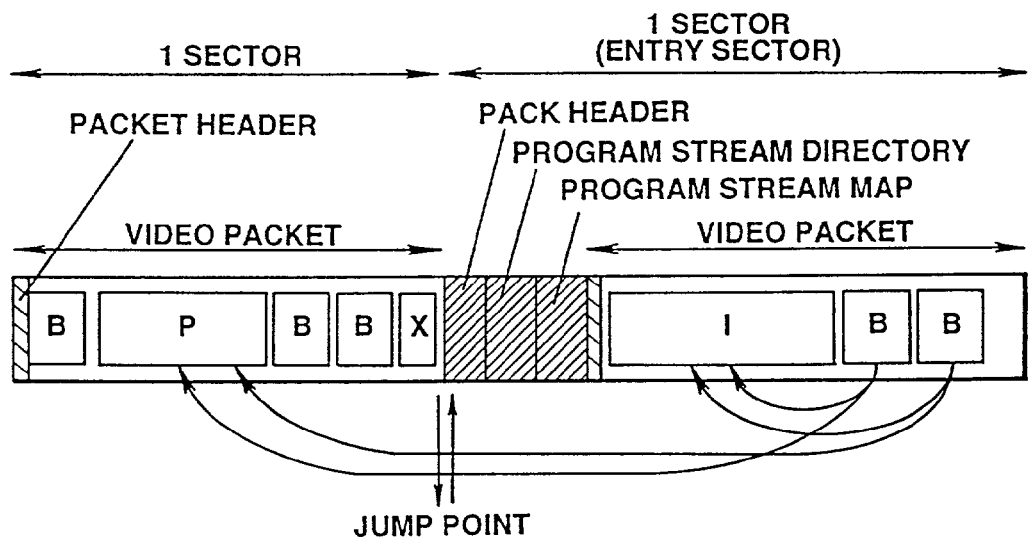

FIG. 23A illustrates completed access units on both sides of a jump point located between two sectors. FIG. 23B illustrates uncompleted access units on both sides of a jump point located between two sectors. FIG. 24A illustrates an arrangement of video data in which prediction or reference for decoding a portion of data need only be made with respect to data on the same side of a jump point as the data to be decoded. A video encoder 1904 which does not perform prediction or reference across a jump point for decoding access units may be utilized if data is arranged as shown in FIG. 24A. FIG. 24B illustrates an arrangement of video data according to which the decoding of certain data on one side of a jump point will necessitate prediction or reference with respect to data located on the opposite side of the jump point.

Figure 25:
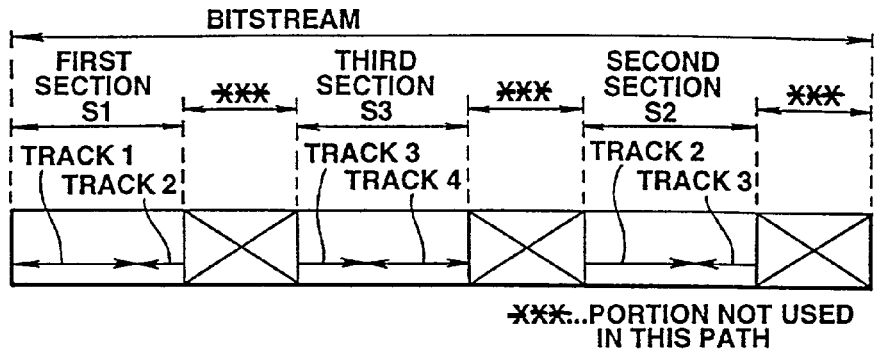
FIG. 25 shows a bitstream including plural data sequences.

FIG. 25 illustrates a data format according to the invention produced when plural data sequences, that is paths, are recorded on the information carrier. As shown, the bitstream in the recording medium has its path constituted by three sections S1, S2, and S3 which are separated by two unused portions of the information carrier. Reproduction of a version of the program constitutes reproduction of sections S1, S2, S3 in order. Section S is recorded on tracks 1 and 2, section S2 is recorded on tracks 2 and 3, and section S3 is recorded on tracks 3 and 4.

In a straightforward reproduction operation, controller 2120 controls data reproduction to commence at the leading end of the first section which is presumed to be recorded in the first section S1. Controller 2120 detects the program stream map (PSM) stored in the entry point recorded in the first section S1 and detects the path_descriptor( ) associated with the path to be reproduced from the path_descriptors( ) area. Controller 2120 stores the path_descriptor information in entry point storing unit 2122. Plural path_descriptors may be present in each path of the PSM.

The information of pX_sectors_to_read, indicated by arrow $26_1$, pX_sectors_from_first, indicated by arrow $26_2$, pX_offset next_section, indicated by arrow $26_3$, pX_offset_previous_section, indicated by arrow $26_4$, pX_offset_next_track, indicated by arrow $26_5$ and pX_offset_previous_track, indicated by arrow $26_6$, are included in path_descriptor information, as explained above and illustrated in FIGS. 26A, 26B, and 26C.

Figure 26A:
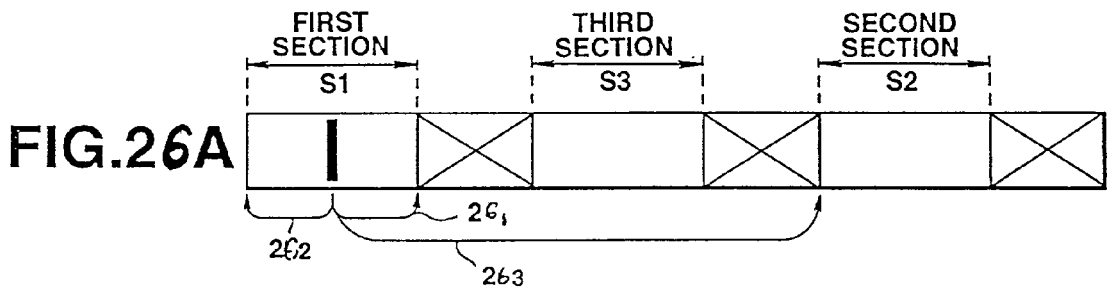
FIGS. 26A, 26B, and 26C show a reproduction operation.

After storing the path_descriptor( ) information, controller 2120 compares the sector address of the sector currently reproduced from the drive control circuit 2106 to the sector address stored in entry point storing unit 2122, as indicated by arrow $26_1$ in FIG. 26A. When the end point of the first section S1 is reached, shown at the tip of arrow $26_1$ in FIG. 26A, the controller 2120 controls the drive controlling circuit 2106 to access the start position of the next section. Accordingly, reproduction is started from the leading end of the second section S2, indicated by arrow $26_3$ in FIG. 26A.

After starting reproduction from the leading end of the second section S2, controller 2120 detects in the PSM of the entry point recorded in the second section S2 the path_descriptor information associated with the path to be reproduced, and causes the detected path_descriptor information to be stored in storing unit 2122.

Figure 26B:
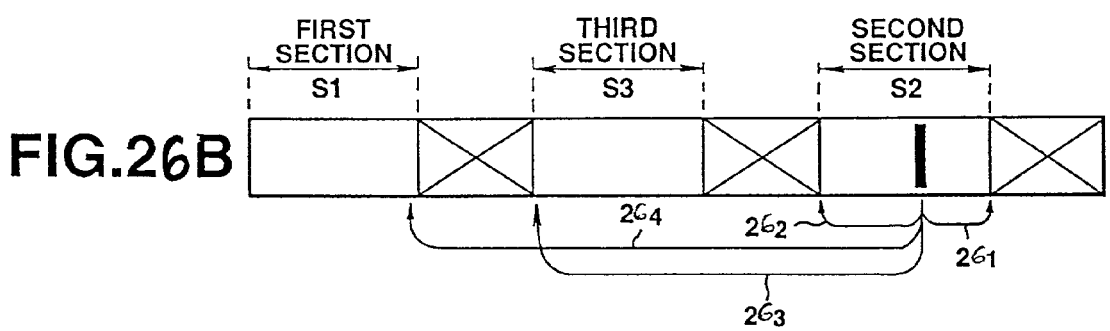

After storing the path_descriptor information, the controller 2120 compares the sector address of the sector currently reproduced by drive control circuit 2106 with the end address stored in entry point storing unit 2122, indicated by arrow $26_1$ of FIG. 26B. Reproduction of the second section continues until the end as indicated by arrow $26_1$ in FIG. 26B. When the reproduction of the second section S2 comes to a close, controller 2120 controls drive control circuit 2106 to access the start position of section S3, as indicated by arrow $26_3$ in FIG. 26B. Reproduction continues at the leading end of section S3.

After starting reproduction at the leading end of section S3, controller 2120 detects in the PSM of the entry point recorded in the section S3 the path_descriptor information corresponding to the path to be reproduced and stores the information in entry point storing unit 2122.

In section S3, pX_offset_next_section will contain a zero value indicating that a next section is not present. Accordingly, controller 2120 allows reproduction of section S3 to proceed to the end of the section, as shown by arrow $26_1$ in FIG. 26C, before reproduction is terminated.

Thus, reproduction of plural sections occurs as described above in accordance with the information stored in the path_descriptor areas of the sections.

An example of a fast forward (FF) reproduction operation according to the invention is described in the following. If fast forward reproduction is commanded during reproduction of section S1 and the path_descriptor information recorded in section S1 has not yet been stored in the entry point storing unit 2122, controller 2120 detects the path_descriptor information associated with the path to be reproduced from the PSM of an arbitrary entry point in section S1, and that path_descriptor information is stored in storing unit 2122.

Controller 2120 controls device 2100 to sequentially access the recorded entry points in accordance with the location information regarding forward and backward adjacent entry points stored in the PSD and to reproduce the I-picture placed directly after the access entry point. The sector address of the entry point being accessed is compared to the sector address indicated by arrow $26_1$ of FIG. 26A stored in the entry point storing unit 2122, and FF reproduction is continued until the end point of section S1 is reached or exceeded.

When the end point of section S1 is reached or exceeded, controller 2120 controls drive control circuit 2106 to access the start position of the next section, that is to a position indicated by arrow $26_3$ of FIG. 26A, for resuming FF reproduction at the leading end of section S2. FF reproduction continues in accordance with the above-described operation to the end point of section S3.

As will be clear to one of ordinary skill, the above-described operation may adapted to achieve a FF reproduction of a program having any number of sections.

An example of a fast reverse (FR) reproduction operation according to the invention is described in the following. If fast reverse reproduction is commanded during reproduction of section S3 and the path_descriptor information recorded in section S3 has not yet been stored in the entry point storing unit 2122, controller 2120 detects the path_descriptor information associated with the path to be reproduced from the PSM of an arbitrary entry point in section S3, and that path_descriptor information is stored in storing unit 2122.

Controller 2120 controls device 2100 to sequentially access the recorded entry points in accordance with the location information regarding forward and backward adjacent entry points stored in the PSD and to reproduce the I-picture placed directly after the access entry point. The sector address of the entry point being accessed is compared to the sector address indicated by arrow $26_2$ of FIG. 26C stored in the entry point storing unit 2122, and FR reproduction is continued until the start point of section S3 is reached or exceeded.

Figure 26C:
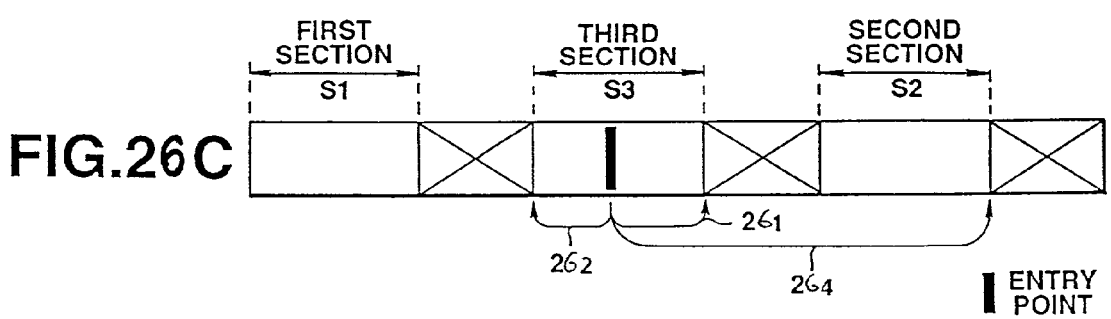

When the start point of section S3 is reached or exceeded, controller 2120 controls drive control circuit 2106 to access the last entry point of the previous section, that is to a position indicated by arrow $26_4$ of FIG. 26C, for resuming FR reproduction at the last entry point of section S2.

Controller 2120 detects the path_descriptor information associated with the path to be reproduced from the PSM of an entry point in section S2, and that path_descriptor information is stored in storing unit 2122. Controller 2120 then controls device 2100 to sequentially access the recorded entry points and compares the sector address of the entry point being accessed with the sector address stored in the entry point storing unit 2122, indicated by arrow $26_2$ of FIG. 26B. FR reproduction is continued until the start point of section S2 is reached or exceeded.

When the start point of section S2 is reached or exceeded, controller 2120 controls drive control circuit 2106 to access the last entry point of the previous section, that is to a position indicated by arrow $26_4$ of FIG. 26B, for resuming FR reproduction at the last entry point of section S1. Controller 2120 detects the path_descriptor information associated with the path to be reproduced from the PSM of an entry point in section S1, and that path_descriptor information is stored in storing unit 2122.

In section S1, pX_offset_previous_section will contain a zero value indicating that a prior section is not present. Accordingly, controller 2120 allows reproduction of section S1 to proceed to the start of the section, as shown by arrow $26_2$ in FIG. 26A, before reproduction is terminated.

As will be clear to one of ordinary skill, the above-described operation may adapted to achieve a FR reproduction of a program having any number of sections.

An example of a track searching reproduction operation according to the invention is described in the following. If forward track search or backwards track search reproduction is commanded and the path_descriptor information has not yet been stored in the entry point storing unit 2122, controller 2120 detects the PSM of the entry point near to the current point while detecting from plural path_descriptors present in each path in the PSM the path_descriptor information associated with the path to be reproduced, and that path_descriptor information is stored in storing unit 2122.

Controller 2120 controls drive control circuit 2106 to access the position in the path descriptor information represented by the pX_offset_next_track information, associated with arrow $27_6$ of FIG. 27. Since the information from which the leading position of the track directly preceding and directly succeeding the track is recorded as pX_offset_previous_track information and pX_offset_next_track information in the path_descriptor information of the entry point at the leading end of the track, the leading end of the track preceding or succeeding the track by a number of tracks can be accessed by repeating the accessing operation.

Figure 27A:
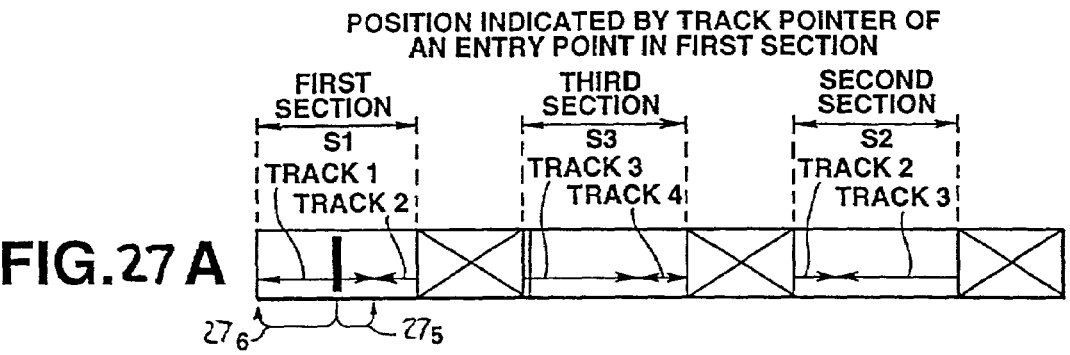
FIGS. 27A, 27B, and 27C show entry points in plural sections.
Figure 27B:
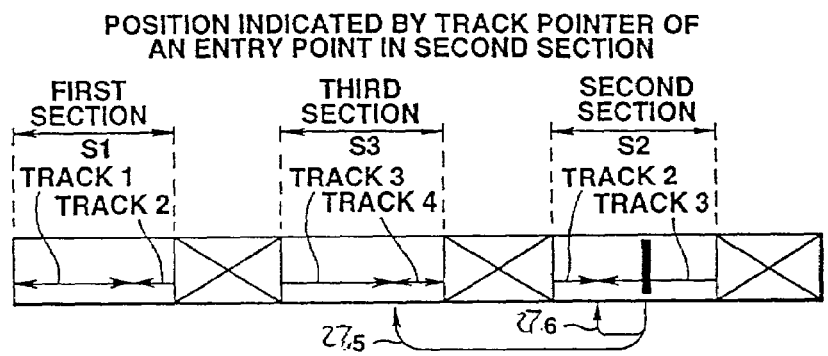
Figure 27C:
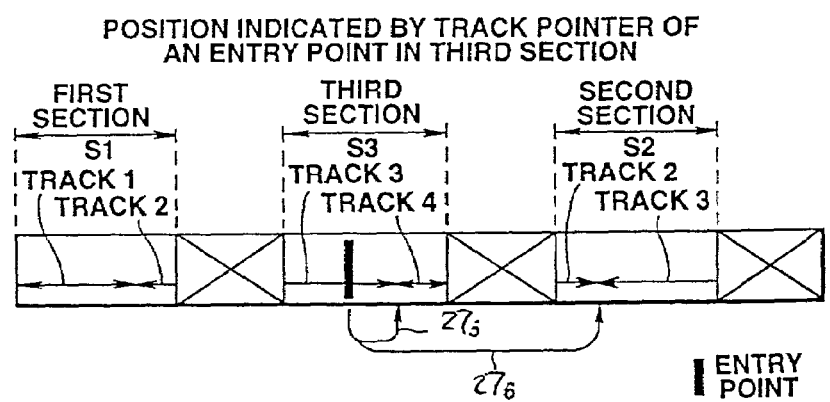

FIGS. 27A, 27B, and 27C illustrate examples of entry points arranged in each section. The positions represented by pX_offset_previous_track information are indicated by arrows $27_6$ and the positions represented by pX_offset_next_track information are indicated by arrow $27_5$. Both pX_offset_previous_track information and pX_offset_next_track information are recorded at an entry point. As shown in FIGS. 27A, 27B, and 27C, since pX_offset_previous_track information and pX_offset_next_track information specify the positions of the starting points of the directly preceding and directly succeeding tracks beyond the boundaries of the current section, the starting points of tracks can be speedily and correctly accessed even when the path comprises plural sections.

Analogously, a time code search may also be achieved utilizing path descriptor information. In response to a command to search for a particular time code, controller 2120 may access entry points in other sections to locate the entry point having a particular time code according to the processes described above in connection with FF reproduction and FR reproduction. Alternatively, search for an entry point having a particular time code may be achieved by initially sequentially detecting the time code of the entry point of the leading end and/or the end point of each section. From the relative magnitudes of the time codes and by having access to the entry points in other sections as described above, controller 2120 may determine in which section lies the targeted time code.

The above-described operations may utilize time code information and/or track number information recorded in path_descriptor information or time code_descriptor information of each entry point.

In another embodiment of the reproducing device of FIG. 21, a less expensive reproducing device may be constructed by limiting the functionality of controller 2120. Specifically, such a device may not be capable of detecting path_descriptor information sufficiently during reproduction or special reproduction operations. In such a reproducing device, reproduction and fast reproduction in the forward and reverse directions may be achieved for a particular path which is constituted by only one section by reading out and storing the leading points and end points of the path from table-of-contents (TOC) information prior to reproduction of the program. If time code information or track number information need not be displayed, path_descriptor information need not be reproduced during a reproduction operation. A controller 2120 which cannot reproduce path_descriptor information can be constructed at a lower cost and hence an inexpensive reproducing device may be produced.

In the above-described embodiments, the information representing the data reproducing sequence (path) is placed and recorded in the path_descriptor information in the program stream map (PSM) information included in the multiplexed data. This format enables a reproducing device not having abundant memory to access and store information required during a particular period of reproduction in order to control the reproducing sequence and to perform editing reproduction processing.

Alternatively, information representing the data reproducing sequence (path) may be collectively recorded outside the multiplexed data instead of being incorporated into the multiplexed data. Path_descriptor information for each entry point may be combined with the sector addresses of the entry points and recorded at a single recording position, such as a table-of-contents area.

As a further alternative, the starting addresses and last entry point addresses of program sections may be arranged according to each path and recorded at a single recording position, such as a table-of-contents area. A reproducing device have a relatively large storage capacity may then access the address information prior to reproduction of the multiplexed data and thus have information sufficient for random access to any section of any path. As another alternative, the reproduction sequence of a particular path may be re-arranged and transferred to another information carrier with reference to only table of contents data and without reproducing the multiplexed data itself.

Although illustrative embodiments of the present invention and modifications thereof have been described in detail herein, it is to be understood that this invention is not limited to these precise embodiments and modifications, and that other modifications and variations may be affected therein by one skilled in the art without departing from the scope and spirit of the invention as defined by the appended claims.

The invention claimed is:

1. A signal recorded on a recording medium, said signal comprising:
    video information representative of a coded video program; and
    control information for displaying a plurality of versions of said video program, said control information including, for each of said versions, address information indicative of the locations of portions of said video information that are sequentially accessed to generate said version;
    wherein said video information and said control information are in the form of packets, and a control information packet is multiplexed with video information packets so that said control information packet is positioned in a segment directly following an entry point of said video information, said segment also including an independently coded I-frame first after the entry point.

2. The signal according to claim 1, wherein said video information includes intra-coded pictures and inter-coded pictures.

3. The signal according to claim 1, wherein said address information is indicative of entry points for at least one of said versions.

4. The signal according to claim 1, wherein said control information includes a start address and an end address for at least one of said versions.

5. The signal according to claim 1, wherein said control information includes playtime information for at least one of said versions.

6. The signal according to claim 1, wherein at least one of said versions is generated according to a rating level.

7. A recording method, comprising the steps of:
    multiplexing video information and control information to generate multiplexed information, said video information being representative of a coded video program, and said control information being operable to display a plurality of versions of said video program and including, for each of said versions, address information indicative of the locations of portions of said video information that are sequentially accessed to generate said version; and
    recording said multiplexed information onto a recording medium;
    wherein said video information and said control information are in the form of packets, and a control information packet is multiplexed with video information packets so that said control information packet is positioned in a segment directly following an entry point of said video information, said segment also including an independently coded I-frame first after the entry point.

8. The method according to claim 7, wherein said video information includes intra-coded pictures and inter-coded pictures.

9. The method according to claim 7, wherein said address information is indicative of entry points for at least one of said versions.

10. The method according to claim 7, wherein said control information includes a start address and an end address for at least one of said versions.

11. The method according to claim 7, wherein said control information includes playtime information for at least one of said versions.

12. The method according to claim 7, wherein at least one of said versions is generated according to a rating level.

13. A recording apparatus, comprising:
    a multiplexer for multiplexing video information and control information to generate multiplexed information, said video information being representative of a coded video program, and said control information being operable to display a plurality of versions of said video program and including, for each of said versions, address information indicative of the locations of portions of said video information that are sequentially accessed to generate said version; and a recorder for recording said multiplexed information onto a recording medium;

wherein said video information and said control information are in the form of packets, and a control information packet is multiplexed with video information packets so that said control information packet is positioned in a segment directly following an entry point of said video information, said segment also including an independently coded I-frame first after the entry point.

14. The apparatus according to claim 13, wherein said video information includes intra-coded pictures and inter-coded pictures.

15. The apparatus according to claim 13, wherein said address information is indicative of entry points for at least one of said versions.

16. The apparatus according to claim 13, wherein said control information includes a start address and an end address for at least one of said versions.

17. The apparatus according to claim 13, wherein said control information includes playtime information for at least one of said versions.

18. The apparatus according to claim 13, wherein at least one of said versions is generated according to a rating level.

19. A reproduction method, comprising the steps of:

reproducing multiplexed information from a recording medium, said multiplexed information including video information and control information, said video information being representative of a coded video program, and said control information being operable to display a plurality of versions of said video program and including, for each of said versions, address information indicative of the locations of portions of said video information that are sequentially accessed to generate said version; and demultiplexing said multiplexed information;

wherein said video information and said control information are in the form of packets, and a control information packet has been multiplexed with video information packets so that said control information packet is positioned in a segment directly following an entry point of said video information, said segment also including an independently coded I-frame first after the entry point.

20. The method according to claim 19, wherein said video information includes intra-coded pictures and inter-coded pictures.

21. The method according to claim 19, wherein said address information is indicative of entry points for at least one of said versions.

22. The method according to claim 19, wherein said control information includes a start address and an end address for at least one of said versions.

23. The method according to claim 19, wherein said control information includes playtime information for at least one of said versions.

24. The method according to claim 19, wherein at least one of said versions is generated according to a rating level.

25. A reproduction apparatus, comprising:

a reproducer for reproducing multiplexed information from a recording medium, said multiplexed information including video information and control information, said video information being representative of a coded video program, and said control information being operable to display a plurality of versions of said video program and including, for each of said versions, address information indicative of the locations of portions of said video information that are sequentially accessed to generate said version; and a demultiplexer for demultiplexing said multiplexed information;

wherein said video information and said control information are in the form of packets, and a control information packet has been multiplexed with video information packets so that said control information packet is positioned in a segment directly following an entry point of said video information, said segment also including an independently coded I-frame first after the entry point.

26. The apparatus according to claim 25, wherein said video information includes intra-coded pictures and inter-coded pictures.

27. The apparatus according to claim 25, wherein said address information is indicative of entry points for at least one of said versions.

28. The apparatus according to claim 25, wherein said control information includes a start address and an end address for at least one of said versions.

29. The apparatus according to claim 25, wherein said control information includes playtime information for at least one of said versions.

30. The apparatus according to claim 25, wherein wherein at least one of said versions is generated according to a rating level.

31. A computer readable recording medium on which is recorded a computer program for recording a signal on a recording medium by:

multiplexing video information and control information to generate multiplexed information, said video information being representative of a coded video program, and said control information being operable to display a plurality of versions of said video program and including, for each of said versions, address information indicative of the locations of portions of said video information that are sequentially accessed to generate said version; and recording said multiplexed information onto the recording medium;

wherein said video information and said control information are in the form of packets, and a control information packet is multiplexed with video information packets so that said control information packet is positioned in a segment directly following an entry point of said video information, said segment also including an independently coded I-frame first after the entry point.

32. The computer readable recording medium according to claim 31, wherein said video information includes intra-coded pictures and inter-coded pictures.

33. The computer readable recording medium according to claim 31, wherein said address information is indicative of entry points for at least one of said versions.

34. The computer readable recording medium according to claim 31, wherein said control information includes a start address and an end address for at least one of said versions.

35. The computer readable recording medium according to claim 31, wherein said control information includes playtime information for at least one of said versions.

36. A computer readable recording medium on which is recorded a computer program for reproducing a signal from a recording medium by:

reproducing multiplexed information from the recording medium, said multiplexed information including video information and control information, said video information being representative of a coded video program, and said control information being operable to display a plurality of versions of said video program and including, for each of said versions, address information indicative of the locations of portions of said video information that are sequentially accessed to generate said version; and demultiplexing said multiplexed information;

wherein said video information and said control information are in the form of packets, and a control information packet has been multiplexed with video information packets so that said control information packet is positioned in a segment directly following an entry point of said video information, said segment also including an independently coded I-frame first after the entry point.

37. The computer readable recording medium according to claim 36, wherein said video information includes intra-coded pictures and inter-coded pictures.

38. The computer readable recording medium according to claim 36, wherein said address information is indicative of entry points for at least one of said versions.

39. The computer readable recording medium according to claim 36, wherein said control information includes a start address and an end address for at least one of said versions.

40. The computer readable recording medium according to claim 36, wherein said control information includes playtime information for at least one of said versions.

41. The computer readable recording medium according to claim 36, wherein at least one of said versions is generated according to a rating level.

42. A processor readable information carrier on which at least one program composed of video data is stored, said video data being partitioned into a plurality of sections, and each said section including path information corresponding to one or more program versions, whereby said sections may be reproduced from said carrier in a linked fashion in a plurality of combinations to generate respective ones of said program versions, and whereby, for a program version being reproduced from paid carrier, said path information includes positional information of a previous section entry point and a next section start address of a next section to be reproduced following reproduction of a currently reproducing section, said previous section entry point indicating entry to a first following independently coded I-frame.

43. A processor readable information carrier as set forth in claim 42, wherein for a program version being reproduced from said carrier, said path information includes positional information indicative of a section end of a currently reproducing section.

44. A processor readable information carrier as set forth in claim 42, wherein for a program version being reproduced from said carrier, said path information includes positional information indicative of a section start of a currently reproducing section.

45. A processor readable information carrier as set forth in claim 42, wherein for a program version being reproduced from said carrier, said path information includes positional information indicative of a section end of a last reproduced section.

46. A recording method for recording onto an information carrier at least one program composed of video data, comprising the steps of:

partitioning said video data into a plurality of sections; and including in each said section path information corresponding to one or more program versions, whereby said sections may be reproduced from said carrier in a linked fashion in a plurality of combinations to generate respective ones of said program versions, and whereby, for a program version being reproduced from said carrier, said path information includes positional information of a previous section entry point and a next section start address of a next section to be reproduced following reproduction of a currently reproducing section, said previous section entry point indicating entry to a first following independently coded I-frame.

47. A recording method as set forth in claim 46, wherein for a program version being reproduced from said carrier, said path information includes positional information indicative of a section end of a currently reproducing section.

48. A recording method as set forth in claim 46, wherein for a program version being reproduced from said carrier, said path information includes positional information indicative of a section start of a currently reproducing section.

49. A recording method as set forth in claim 47, wherein for a program version being reproduced from said carrier, said path information includes positional information indicative of a section end of a last reproduced section.

50. A recording apparatus recording onto an information carrier at least one program composed of video data, comprising:

means for partitioning said video data into a plurality of sections; and means for including in each said section path information corresponding to one or more program versions, whereby said sections may be reproduced from said carrier in a linked fashion in a plurality of combinations to generate respective ones of said program versions, and whereby, for a program version being reproduced from said carrier, said path information includes positional information of a previous section entry point and a next section start address of a next section to be reproduced following reproduction of a currently reproducing section, said previous section entry point indicating entry to a first following independently coded I-frame.

51. A recording apparatus as set forth in claim 50, wherein for a program version being reproduced from said carrier, said path information includes positional information indicative of a section end of a currently reproducing section.

52. A recording apparatus as set forth in claim 50, wherein for a program version being reproduced from said carrier, said path information includes positional information indicative of a section start of a currently reproducing section.

53. An recording apparatus as set forth in claim 50, wherein for a program version being reproduced from said carrier, said path information includes positional information indicative of a section end of a last reproduced section.

54. A reproducing method for reproducing from an information carrier at least one program composed of video data, said video data having been recorded onto said information carrier by partitioning said video data into a plurality of sections and including in each said section path information corresponding to one or more program versions, said method comprising the steps of:

reading a plurality of said sections from said information carrier; and linking said sections read from said information carrier to generate at least one of said program versions, whereby said sections may be reproduced from said carrier in a linked fashion in a plurality of combinations to generate respective ones of said program versions, and whereby, for a program version being reproduced from said carrier, said path information includes positional information of a previous section entry point and a next section start address of a next section to be reproduced following reproduction of a currently reproducing section, said previous section entry point indicating entry to a first following independently coded I-frame.

55. A reproducing method as set forth in claim 54, wherein for a program version being reproduced from said carrier, said path information includes positional information indicative of a section end of a currently reproducing section.

56. A reproducing method as set forth in claim 54, wherein for a program version being reproduced from said carrier, said path information includes positional information indicative of a section start of a currently reproducing section.

57. A reproducing method as set forth in claim 54, wherein for a program version being reproduced from said carrier, said path information includes positional information indicative of a section end of a last reproduced section.

58. A reproducing apparatus for reproducing from an information carrier at least one program composed of video data, said video data having been recorded onto said information carrier by partitioning said video data into a plurality of sections and including in each said section path information corresponding to one or more program versions, said apparatus comprising:

means for reading a plurality of said sections from said information carrier; and means for linking said sections read from said information carrier to generate at least one of said program versions, whereby said sections may be reproduced from said carrier in a linked fashion in a plurality of combinations to generate respective ones of said program versions, and whereby, for a program version being reproduced from said carrier, said path information includes positional information of a previous section entry point and a next section start address of a next section to be reproduced following reproduction of a currently reproducing section, said previous section entry point indicating entry to a first following independently coded I-frame.

59. A reproducing apparatus as set forth in claim 58, wherein for a program version being reproduced from said carrier, said path information includes positional information indicative of a section end of a currently reproducing section.

60. A reproducing apparatus as set forth in claim 58, wherein for a program version being reproduced from said carrier, said path information includes positional information indicative of a section start of a currently reproducing section.

61. A reproducing apparatus as set forth in claim 58, wherein for a program version being reproduced from said carrier, said path information includes positional information indicative of a section end of a last reproduced section.

62. The signal according to claim 1, wherein the address information includes a previous portion entry point information and a next portion start address information.

63. The signal according to claim 7, wherein the address information includes a previous portion entry point information and a next portion start address information.

64. The signal according to claim 13, wherein the address information includes a previous portion entry point information and a next portion start address information.

65. The signal according to claim 19, wherein the address information includes a previous portion entry point information and a next portion start address information.

66. The signal according to claim 25, wherein the address information includes a previous portion entry point information and a next portion start address information.

67. The signal according to claim 31, wherein the address information includes a previous portion entry point information and a next portion start address information.

68. The signal according to claim 36, wherein the address information includes a previous portion entry point information and a next portion start address information.

* * * * *